(12) United States Patent
Truong et al.

(10) Patent No.: US 10,282,929 B2
(45) Date of Patent: May 7, 2019

(54) SYSTEMS AND METHODS FOR SHORT-RANGE COMMUNICATION BETWEEN DEVICES

(71) Applicant: Live Nation Entertainment, Inc., Beverly Hills, CA (US)

(72) Inventors: Benson Truong, Ahwatukee, AZ (US);
Daniel Lewis, Gold Canyon, AZ (US);
Michael Estes, Scottsdale, AZ (US);
Andrew Pratt, Scottsdale, AZ (US);
Justin Burleigh, Phoenix, AZ (US);
Danon Law, Gilbert, AZ (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 15/634,578

(22) Filed: Jun. 27, 2017

(65) Prior Publication Data
US 2018/0005465 A1 Jan. 4, 2018

Related U.S. Application Data

(60) Provisional application No. 62/355,160, filed on Jun. 27, 2016, provisional application No. 62/508,921, filed on May 19, 2017.

(51) Int. Cl.
| | | |
|---|---|---|
| *G07C 9/00* | (2006.01) | |
| *G06Q 10/02* | (2012.01) | |
| *H04W 12/08* | (2009.01) | |
| *H04W 4/80* | (2018.01) | |
| *G07C 9/02* | (2006.01) | |

(52) U.S. Cl.
CPC ....... *G07C 9/00079* (2013.01); *G06Q 10/025* (2013.01); *G07C 9/00103* (2013.01); *H04W 4/80* (2018.02); *H04W 12/08* (2013.01); *G07C 9/02* (2013.01)

(58) Field of Classification Search
None
See application file for complete search history.

(56) References Cited

U.S. PATENT DOCUMENTS

| | | | | |
|---|---|---|---|---|
| 7,706,778 | B2 * | 4/2010 | Lowe | H04L 63/062 455/411 |
| 8,331,544 | B2 * | 12/2012 | Kraus | G07C 9/00944 340/5.7 |
| 8,437,746 | B1 * | 5/2013 | Breau | H04M 7/0075 455/412.2 |
| 8,943,187 | B1 * | 1/2015 | Saylor | H04L 67/306 709/223 |
| 9,489,787 | B1 | 11/2016 | Ives-Halperin et al. | |
| 9,685,012 | B2 * | 6/2017 | Saeedi | G07C 9/00087 |
| 2010/0082491 | A1 | 4/2010 | Rosenblatt et al. | |
| 2015/0294515 | A1 | 10/2015 | Bergdale et al. | |
| 2016/0080943 | A1 | 3/2016 | Ives-Halperin et al. | |

OTHER PUBLICATIONS

International Search Report and Written Opinion for PCT/US2017/039508 dated Aug. 24, 2017, all pages.

\* cited by examiner

*Primary Examiner* — K. Wong
(74) *Attorney, Agent, or Firm* — Kilpatrick Townsend & Stockton LLP

(57) ABSTRACT

The present disclosure relates to systems and methods for communicating between devices using short-range communication links. More specifically, the present disclosure relates to systems and methods for communicating access-right data between devices for verification or transfer.

20 Claims, 19 Drawing Sheets

SYSTEMS AND METHODS FOR SHORT-RANGE COMMUNICATION BETWEEN DEVICES

CROSS REFERENCE TO RELATED APPLICATIONS

This application claims the priority benefit of U.S. Ser. No. 62/355,160, filed Jun. 27, 2016, and U.S. Ser. No. 62/508,921, filed May 19, 2017, the disclosures of each of which are incorporated by reference in its entirety for all purposes.

TECHNICAL FIELD

The present disclosure relates to systems and methods for communicating between devices using short-range communication links. More specifically, the present disclosure relates to systems and methods for communicating access-right data between devices for verification or transfer.

BACKGROUND

Often, verification of access rights to a resource occurs by optically scanning a code. For example, scanner devices can optically scan a code displayed on a user device. However, such codes are generally easily reproduced, thereby lacking security.

SUMMARY

In some examples, a computer-implemented method may be provided. The method may include identifying, by a computing device, a geographical location of a first user device. The first user device may be associated with a digital token that represents a plurality of access rights to a defined location for a defined time period. The method may also include detecting whether the geographical location of the first user device is within the defined location. The first user device may gain entry to the defined location using a first access right of the plurality of access rights. In response to the determining that the geographical location of the first user device is within the defined location, one or more protocols for location-based transferring of access rights may be executed. The one or more protocols for location-based transferring may only be available for execution when the first user device is within the defined location. Executing the one or more protocols may include displaying a continuously transforming image on the first user device, receiving an indication from the second user device that the continuously transforming image was captured at a camera of the second user device, and transmitting a second access right of the plurality of access rights from the first user device to the second user device. Receiving the second access right may enable the second user device to exit the defined location.

In some examples, a system uses tokens stored in user devices or in RFID chips (e.g., embedded within physical documents) to facilitate entry to defined locations, thereby eliminating the need for scanning an access identifier. There is no need to use handheld optical scanners at an entry gate of a defined location (e.g., a venue) because the tokens stored in the user device or RFID chip are transmitted over short-range communication channels to a client agent device located at an entry point of the defined location. Token values can represent access identifiers and various information about the user entering the event (i.e., the token can represent more than the access identifier). For example, the token can include or be associated with information configured by the user in the native app. In addition, access rights cannot be counterfeited because a token stored in the user device is used in lieu of a visible access identifier. A primary load management system can manage all of the tokens so that before the event, access rights can be transferred only by using a native application or website.

In some examples, the system can gather information for each user device that enters the defined location and determine whether to engage with a user based on the gathered information. For example, the system can engage (e.g., present notifications) with users at the event by sending push notifications, messages, SMS texts, and so on for a variety of purposes (e.g., marketing or security). The system can send out notifications to everyone at defined location, selectively send messages to a particular group of users, send messages to a group of users in a particular area of the defined location, etc. As another example, the system identifies which user devices to communicate with if there is an issue with a user who is within the defined location. For example, if a user is intoxicated, the system can generate a notification and transmit the notification to any users associated with the token corresponding to the intoxicated user.

In some examples, when a user enters a defined location, a client agent device can retrieve information locally stored on the user device. The system can then engage with the user device based on that retrieved information. The system can transmit push notifications via the native application executing on the user device to present the information to the user. In some implementations, the system can access one or more data sources in addition to or in lieu of retrieving data locally stored on the user device to obtain the information to present to the user.

In some examples, a single token value can represent multiple access rights. A client agent device can be notified that multiple users are granted entry when a valid token value has been received from a user device. In these examples, there would be no need to individually scan each user entering the defined location. In some examples, the client agent device can retrieve identifiers for the second user devices associated with the first user (e.g., at the time that the access rights are assigned to the first user). Then upon entry, the client agent device can initiate a communication with the second user device. The second user (who is associated with the first user) can be granted entry by showing his or her phone with the initiated communication, or in some examples, may be enabled to enter the defined location without showing any information. In another example, the client agent device can transmit an image or text to the second user devices, which can be displayed for viewing by a gate agent.

In some examples, once group of users associated with a token value has entered the defined location (e.g., when an entry event is detected), the token value can be transferred between devices so that one of the group members can store the token value on his/her phone, thereby enabling that group member to leave the defined location or designated area and return later. For example, the token may be transferred post-entry (into the defined location) from one user device to another user device. This feature may only be available after an entry event has been detected (e.g., after entry into the defined location has been detected). The transferred access right may be verified optically (but can be transferred using near-field communication in some embodiments). The optical code that enables transfer is different from the token code, but an algorithm can generate the same token code even if the optical code changes (e.g., is the image displayed on the first user device continuously is morphed for enhanced security).

In some examples, users who manage a defined location can open an interactive map of the defined location on a native application, select an access right identifier of an access right presented on the interactive map, and then initiate a communication with the user device associated with the access right identifier that was selected on the map. In addition, in real-time, the interactive map can indicate which users have entered the defined location. Further, the system can analyze traffic logistics at gates.

In some examples, entry devices (e.g., client agent devices) that are placed at the entry point of the defined location are self-aware. The configuration of entry devices can be automatic using a control device and a native application. The native application can be installed on each entry device. Touching the control device, which stores all of the configuration settings to an entry device, can transfer the configuration settings to that entry device.

In some examples, a system may also be provided. The system may include one or more data processors, and a non-transitory computer-readable storage medium containing instructions which, when executed on the one or more data processors, cause the one or more data processors to perform the method(s) described above and herein. In some examples, a computer-program product tangibly embodied in a non-transitory machine-readable storage medium, including instructions configured to cause a data processing apparatus to perform the method(s) described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
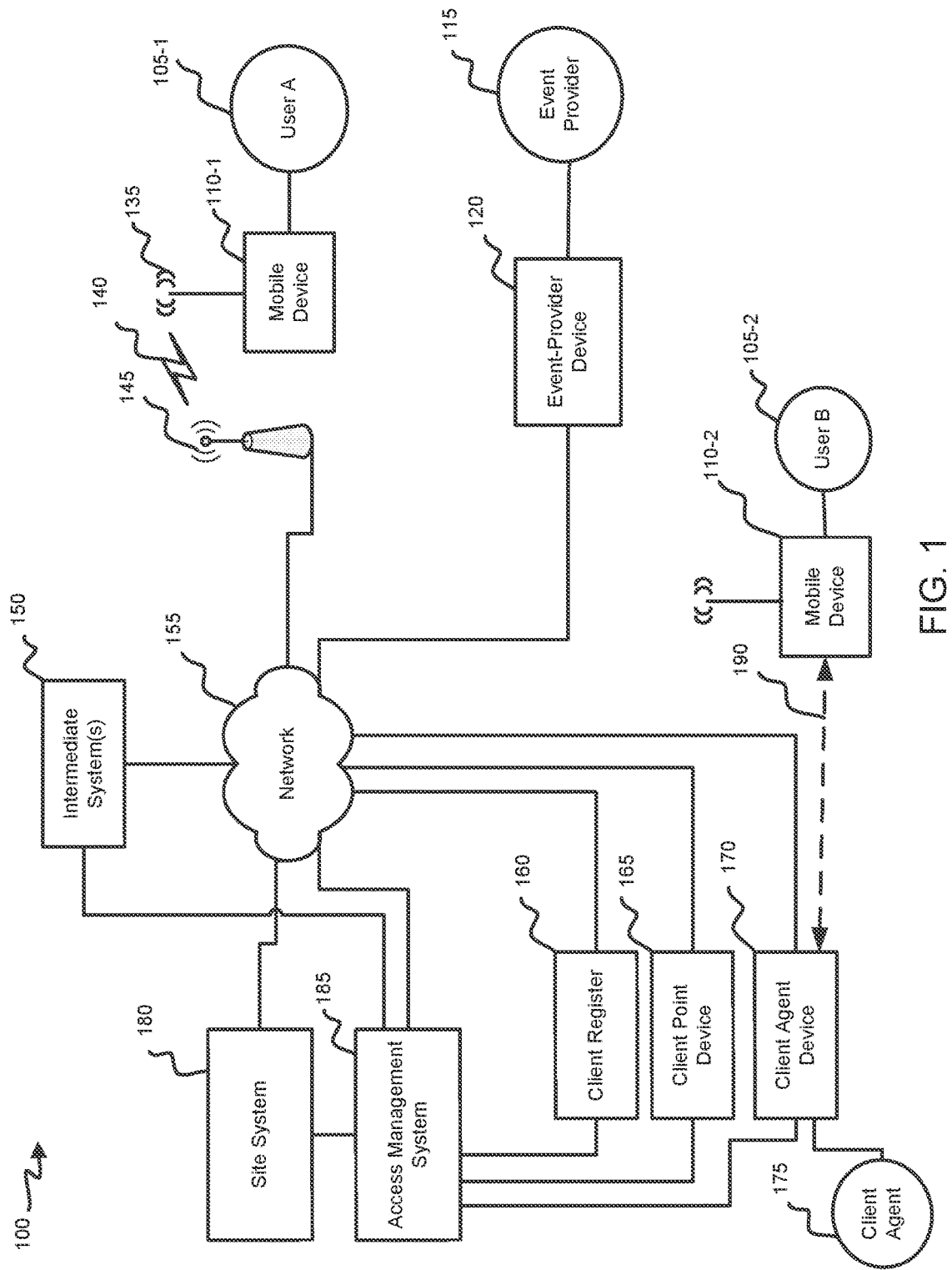
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a defined location. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
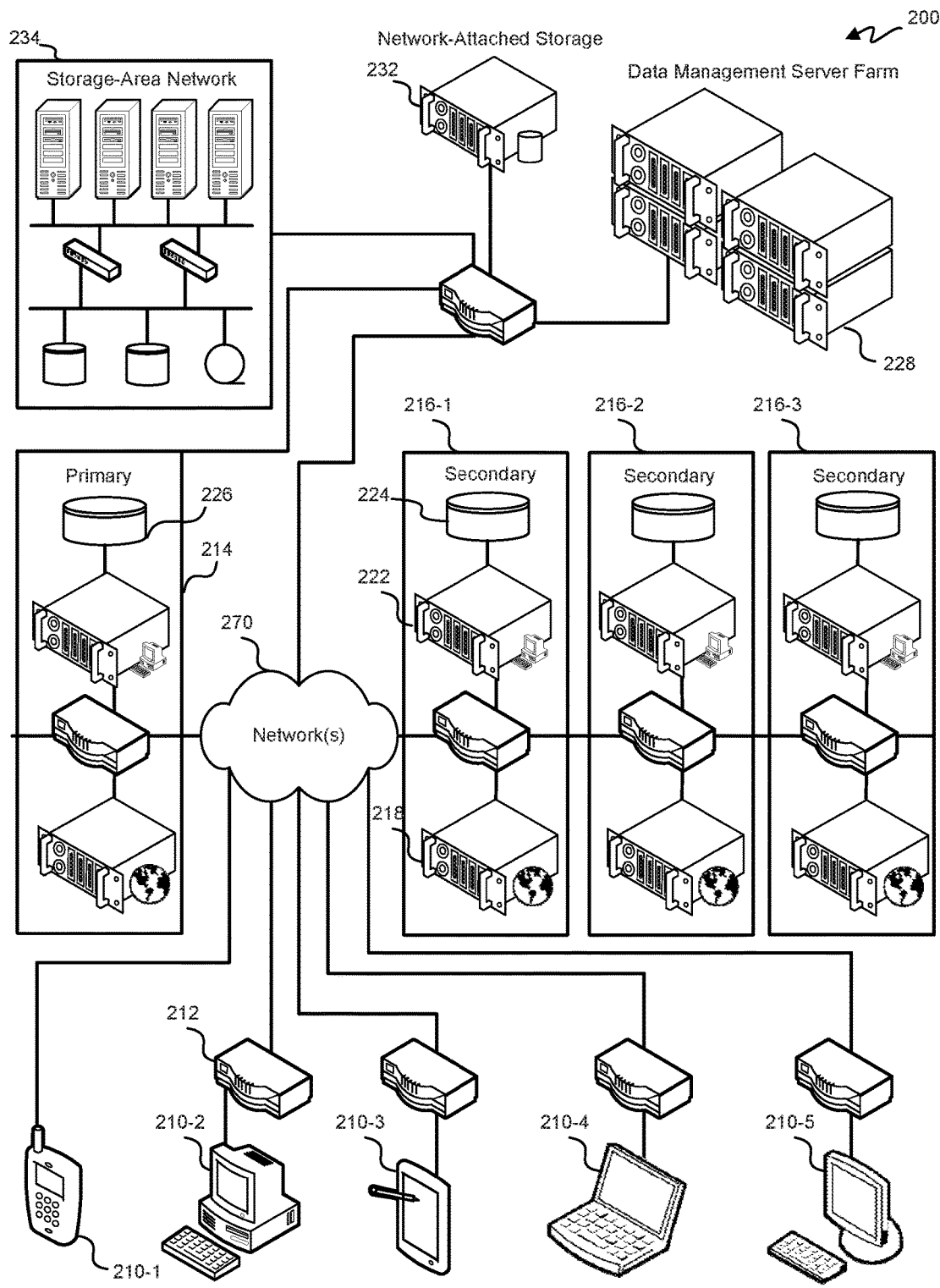
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
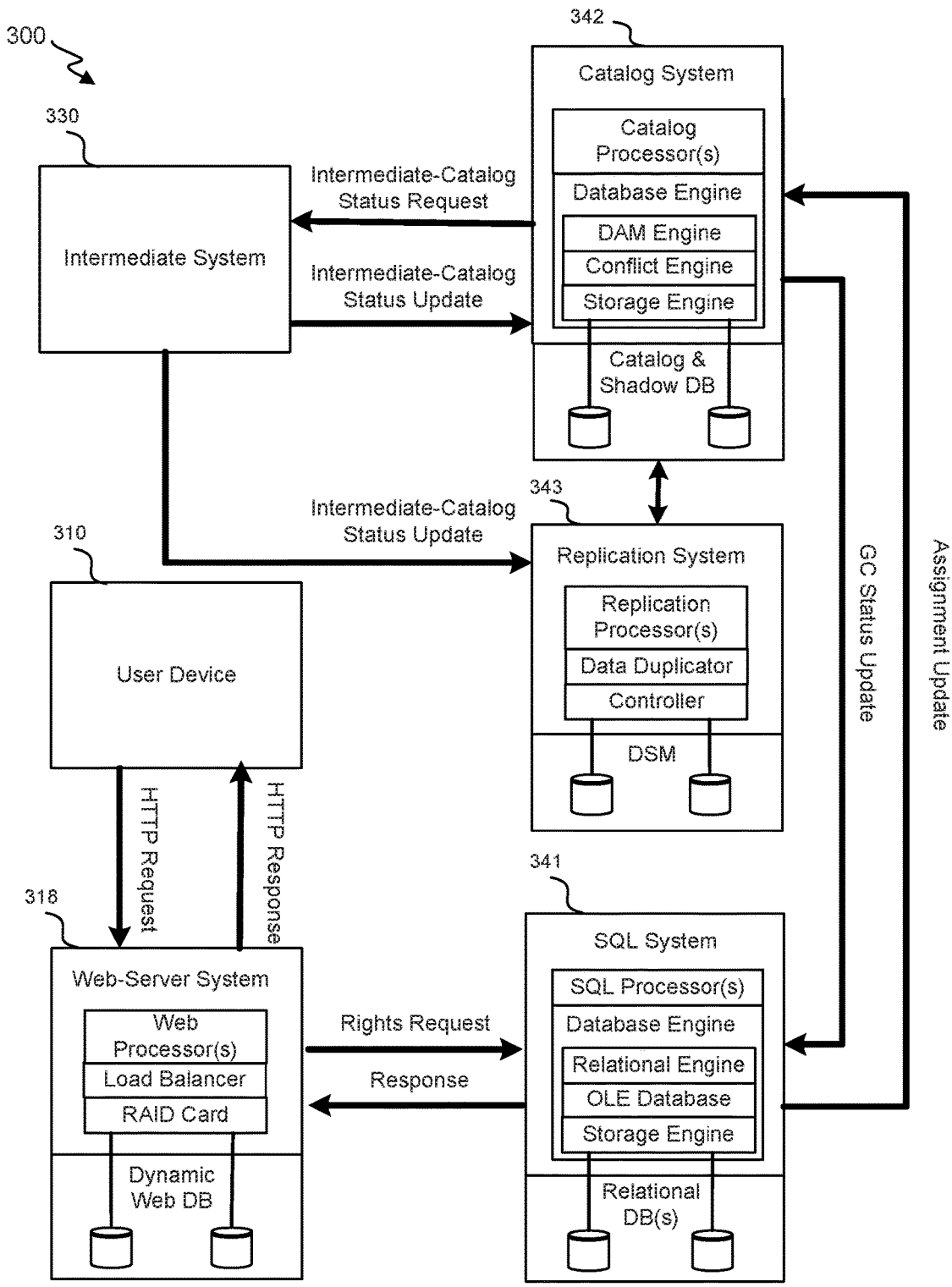
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
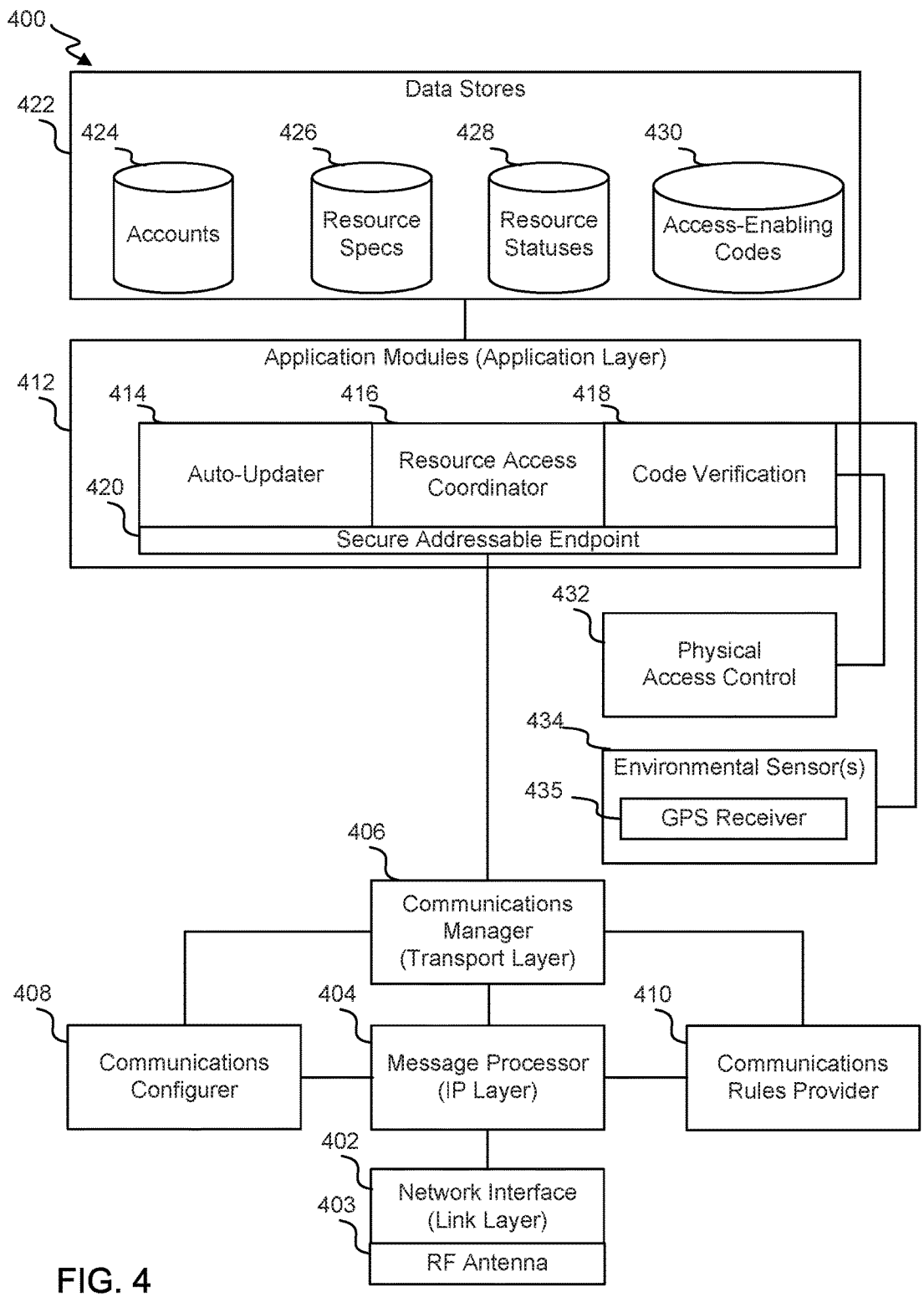
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a defined location of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, an access identifier (e.g., a barcode), a quick response (QR) code, an image, a static code and/or a temporally dynamic code. An access-enabling code can be, for example, unique across all instances, resource types and/or entities. For example, access-enabling codes provided in association for access rights to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
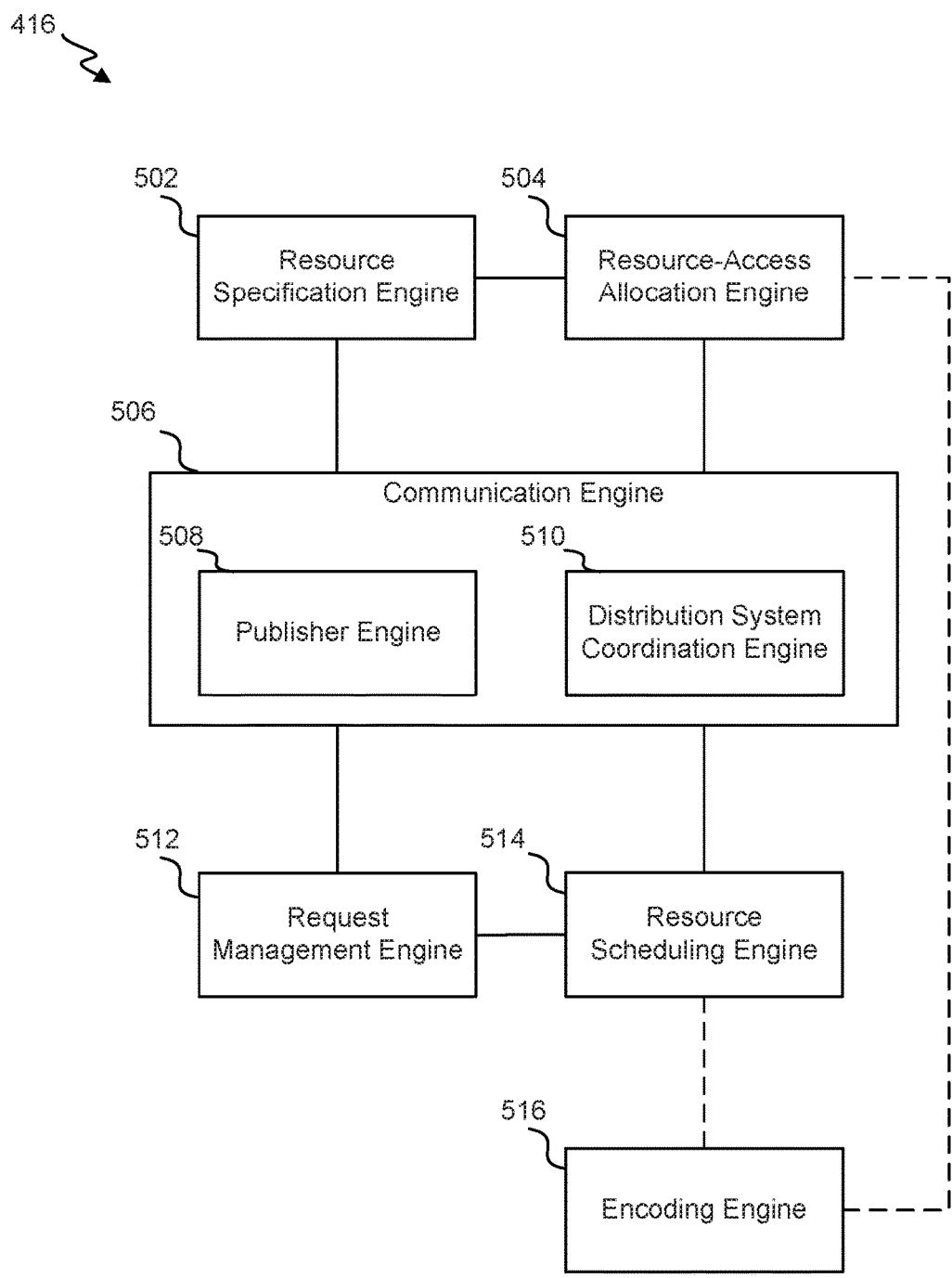
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or (e.g., from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated access right can correspond to one or more access characteristics, such as an processor identifier, a usage time, a memory allocation, a geographic location within a defined location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights within location 1 may be provided for a first intermediate system to assign, and access rights within location 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, assignment history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, an access identifier (e.g., a 1-dimensional or 2-dimensional access identifier), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with an access identifier may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
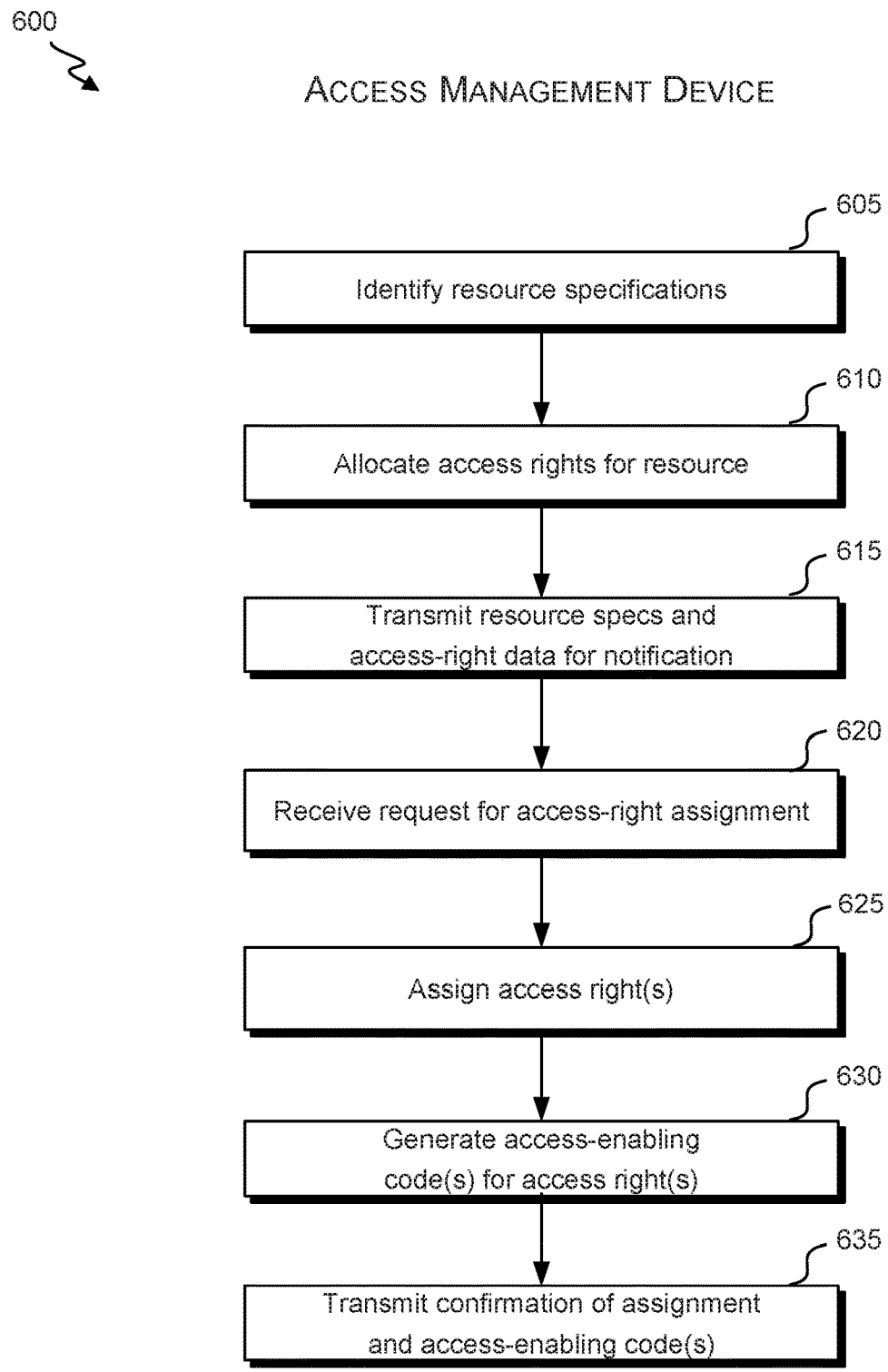
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
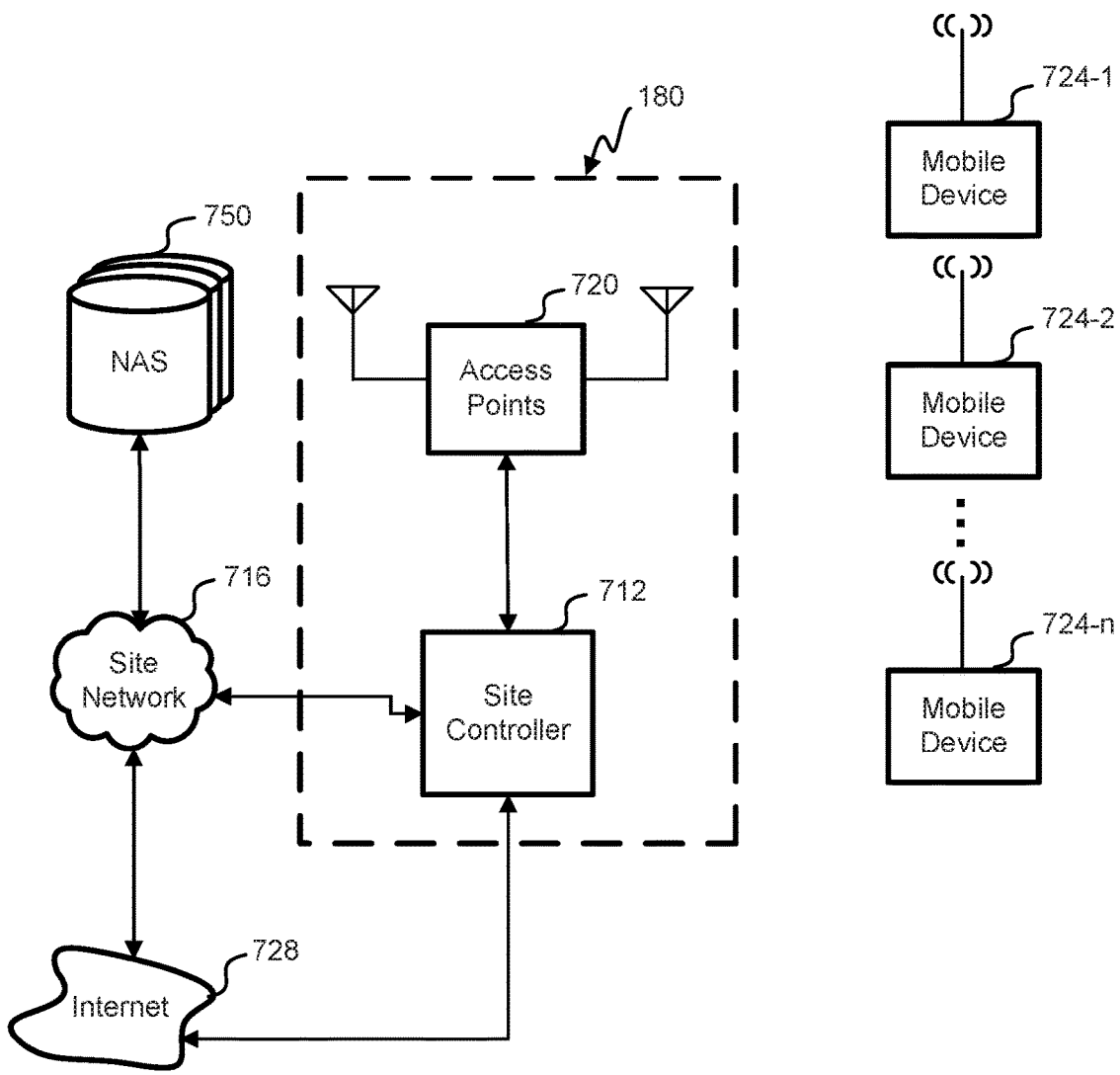
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
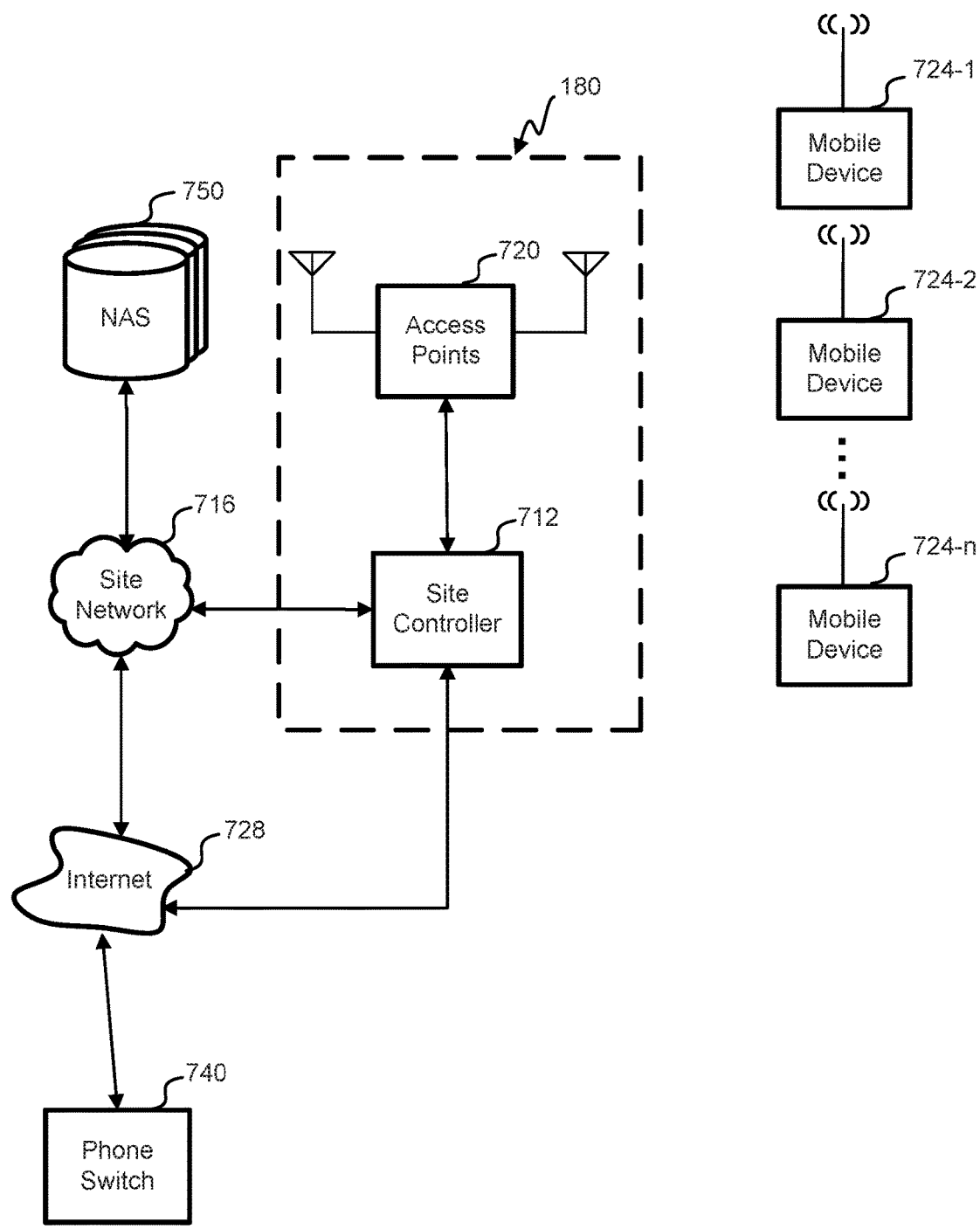

Referring to FIG. 7B, another embodiment of a site system 180 is shown in relation to mobile devices 724-*n*, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
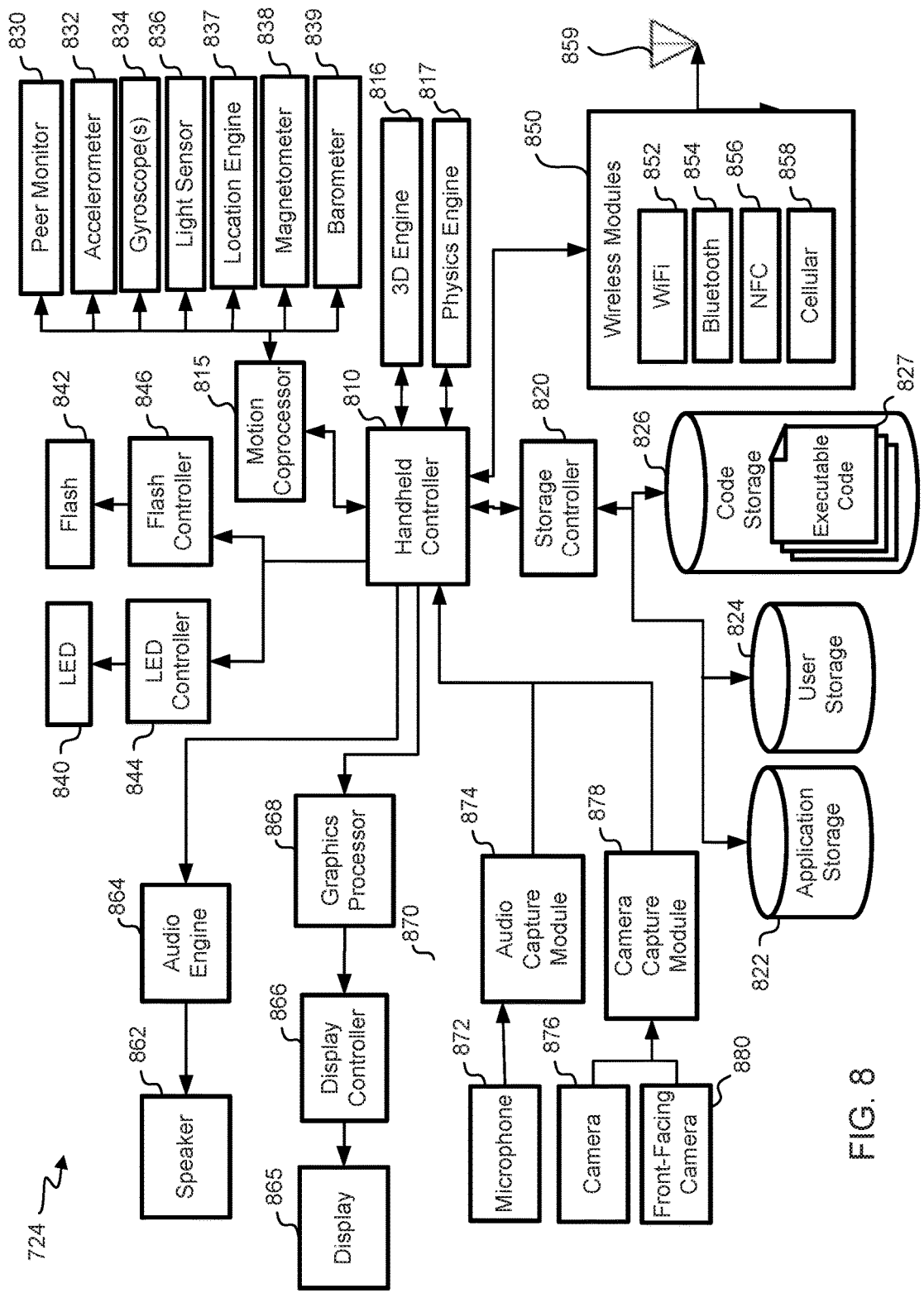
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash

842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
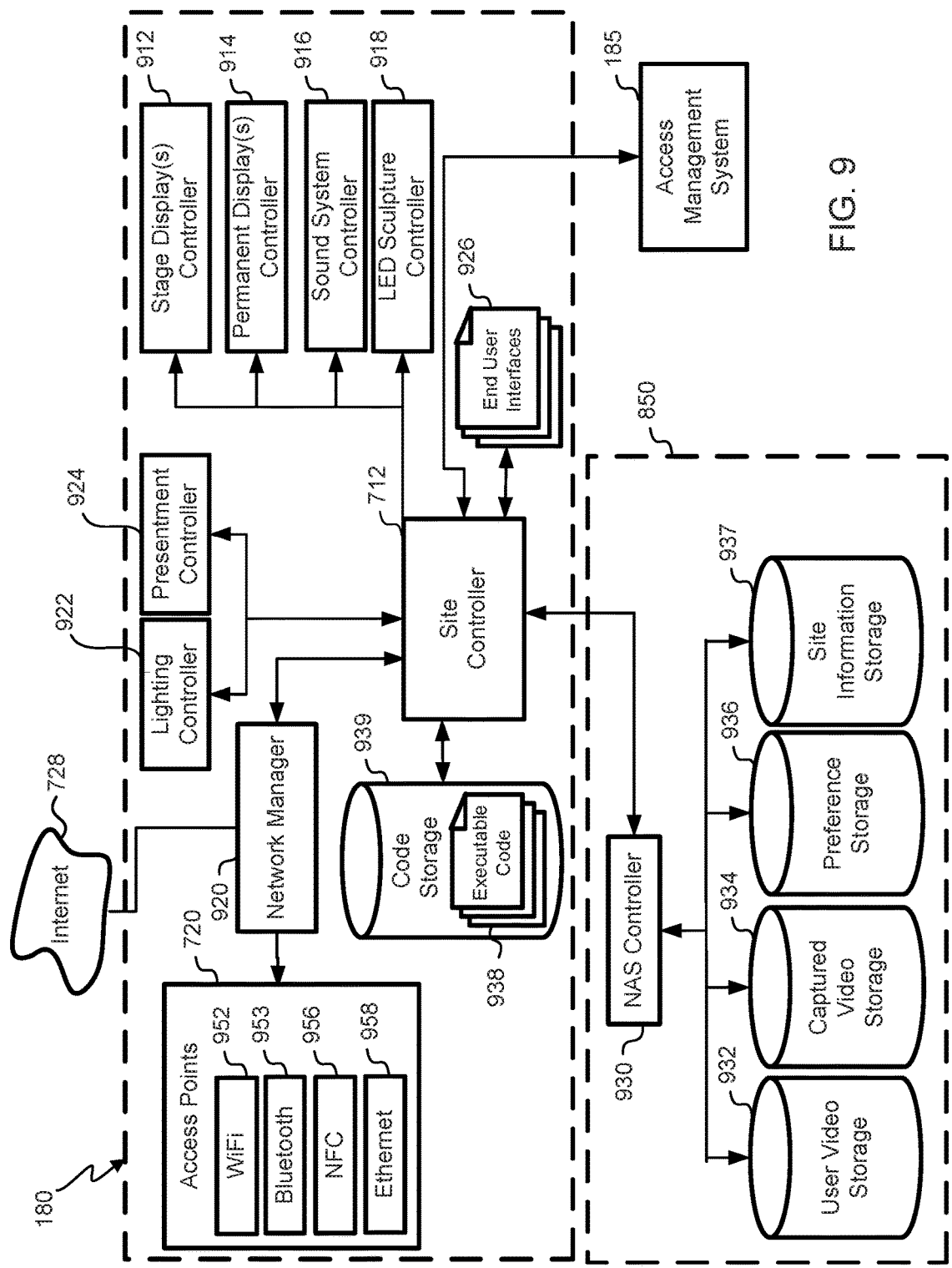
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10A:
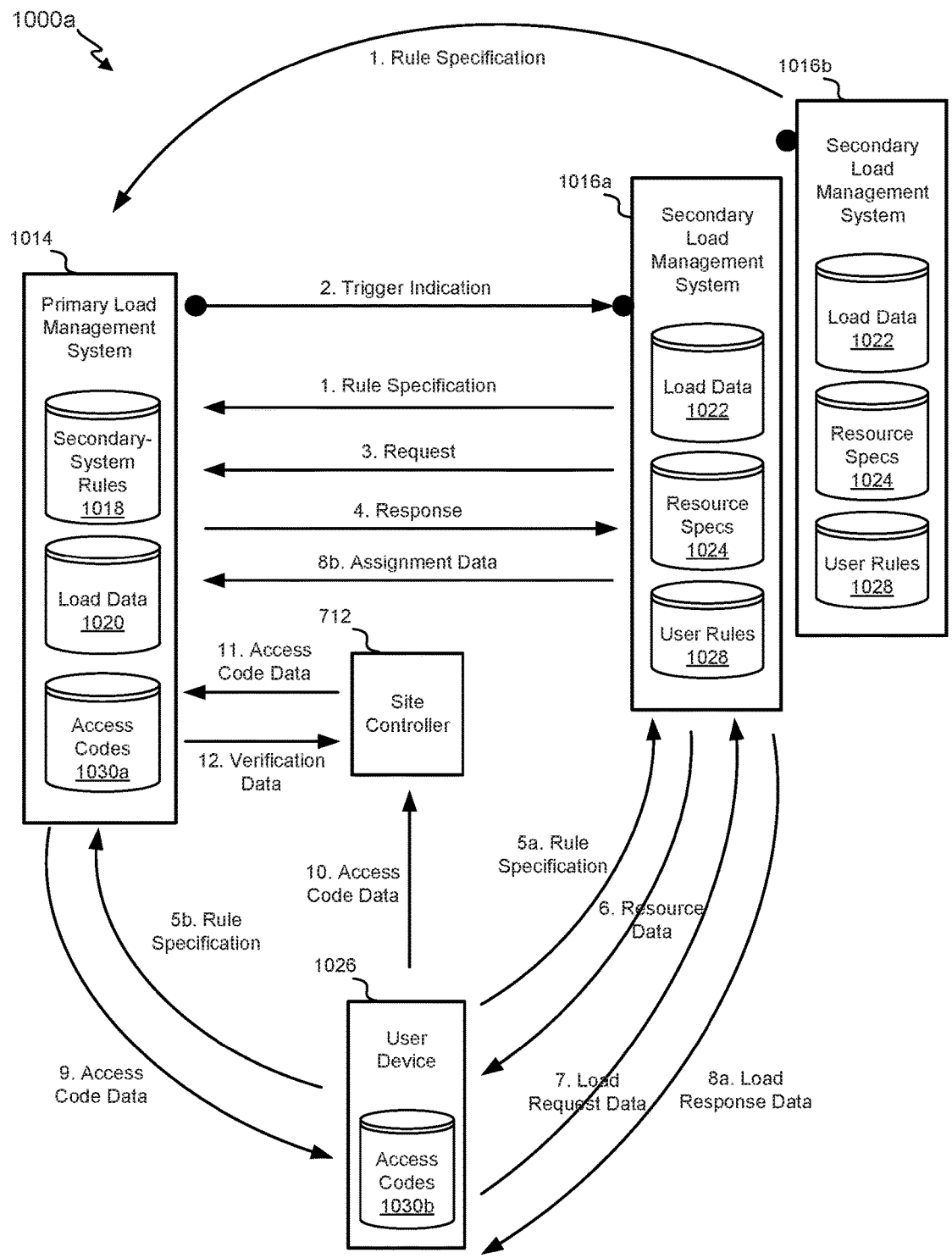
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10A may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested (e.g., and provided payment information for) one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a desired load (e.g., corresponding to a number of access-right slots, such as seats). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization (e.g., weather forecast) corresponding to a resource, a throughput monitor (e.g., identifying a probability of a performing entity in being positioned in a playoff or other game) and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location, one or more performing entities and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in a webpage hosted, controlled and/or managed by secondary load management system 1016a, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming payment information. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, account, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030b. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
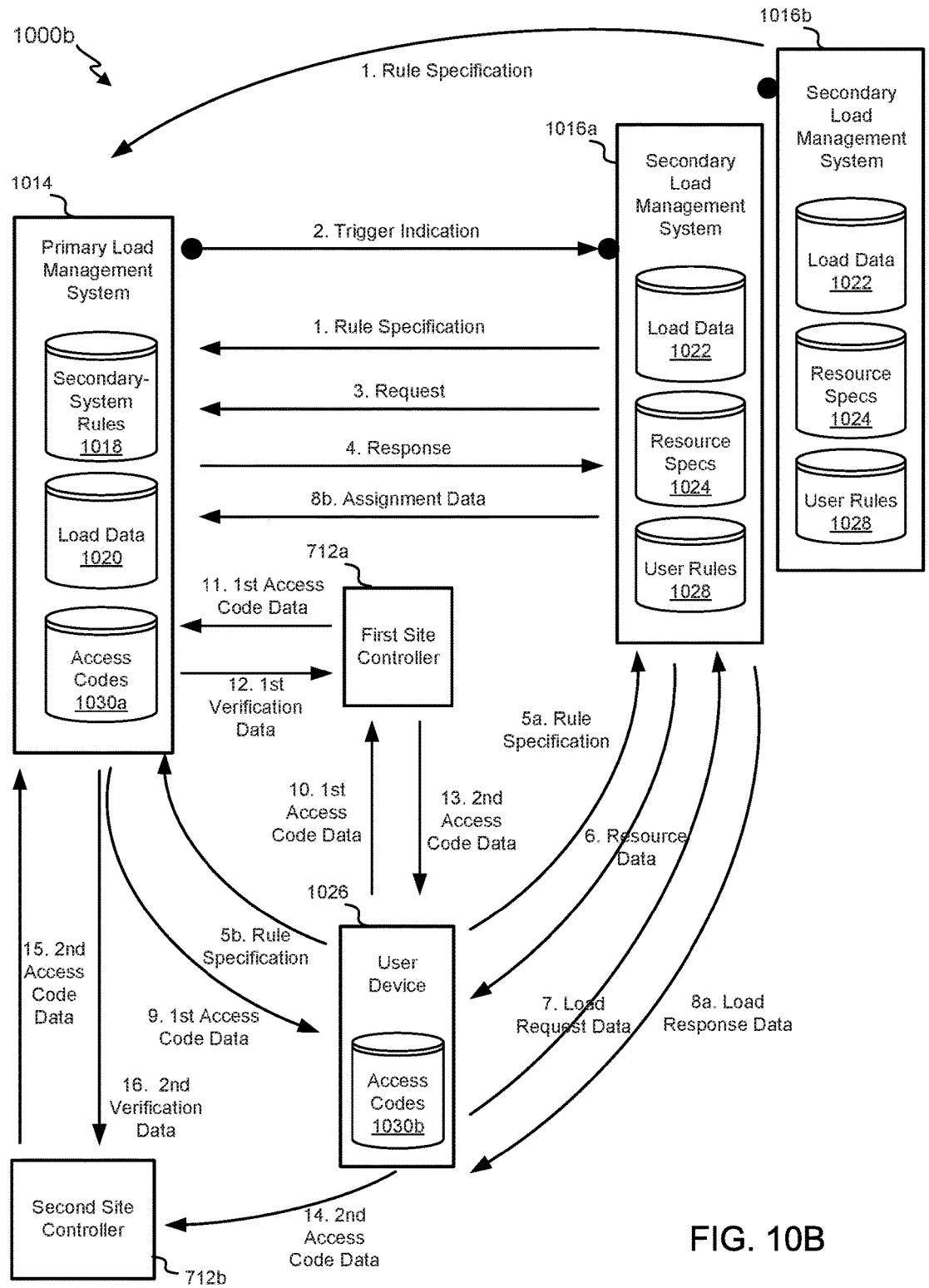

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics (e.g., one or more seats). The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712*b* is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712*b*. Second site controller 712*b* can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712*a*) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712*b*, for example, in response to communications from one or more other site controllers and/or primary load management system 1014 that identify second access code data that have been issued.

Certain aspects and features of the present disclosure relate to systems and methods that provide access-control capabilities relating to users within defined locations. The systems and methods can provide a computer-based platform to clients that enables them to manage aspects of ingress and egress into defined locations. For example, an access right to a resource corresponds to an access-enabling code (e.g., an access identifier) that is used to grant entry into the defined location. While access identifiers serve to enable entry of a user into a defined location, it is difficult to identify information about the user who is actually entering the defined location. As a result, the user who is entering the defined location may not be the same user who was originally assigned to the access right.

According to certain embodiments, the systems and methods provide for retrieving additional information that is stored in the mobile device of the user accessing a defined location. For example, if a user has his or her access right stored on his or her mobile phone, the user can present his or her mobile phone at an entry point of the defined location. An entry device can scan the mobile phone to retrieve the ticket and the additional information from the mobile phone using short-range communication (e.g., Bluetooth, NFC, RFID, etc.). The additional information can be displayed at the entry device located at the gate of the venue. In some cases, the access right or token and the additional information can be stored on other devices associated with the user (e.g., on a smart watch, tablet, etc.).

In some examples, when the user scans his or her mobile phone at an entry device, a native application executing on the mobile phone can present information about the access right. The entry device can display how many other access rights are associated with the access right being scanned. For example, if a token is associated with four access rights, but all four family members are not physically with the user, the entry device can display that four valid access rights are associated with the token and that one or more other users have not entered the defined location.

In some examples, the systems and methods can provide an interface for managing access control into and out of the defined location. For example, the interface can be configured to display an interactive access map that corresponds to access locations (e.g., seats) in the defined location. A user can access the interface using one or more computing devices (e.g., desktop computer, laptop, tablet, etc.). As people enter the defined location, an entry device (also referred to as a client agent device) located at an entry point is configured to scan a mobile device associated with each person (or a group of users). When the entry device scans the mobile device, the entry device can retrieve a token that represents an access right to the defined location. In some cases, the entry device can validate the authenticity of the token locally. In some cases, the entry device can communicate with one or more servers (e.g., a cloud server) to perform the validation of the token. Upon validating the token, the entry device can communicate with a cloud server to notify the cloud server that the user has entered the defined location. During or in conjunction with the token validation process, the entry device can also retrieve additional information associated with the user from the mobile device. The cloud server can receive the indication (e.g., an entry event) that the user has entered the defined location along with the additional information associated with the user. Further, the cloud server can update the interactive access map presented on the interface. For example, updating the interactive access map can include presenting an indicator (e.g., an animated indicator or a still indicator, such as a solid circle) at the access location of the user who entered the defined location (at the moment the user enters). The indicator can represent that the user has now entered the defined location. The user can access the additional information associated with the user using the interactive access map. In some examples, the user can initiate a communication (e.g., a push notification, text message, email message, etc.) with another user's mobile device by selecting the user's access location presented on the interactive access map.

In some examples and according to certain embodiments, the entry devices located within and/or around a defined location can be automatically configured using a control device. In some cases, a control device can establish short-range wireless connections with up to 255 entry devices. The control device can be configured to receive input corresponding to configuration settings for the entry devices. For example, a user can enter configuration settings into the control device. In other examples, the configuration settings can be retrieved by the control device from one or more external or local servers. The control device can automatically trigger the initiation of an application on the entry devices and detect whether or not the entry device is already configured. The control device can transmit the configuration settings to each of the nearby entry devices over the short-range communication links (e.g., Bluetooth). As an illustration, the user can select the defined location using the control device, and the control device can then detect nearby entry devices. The user can provide basic details about how the entry devices are to be named (e.g., a primary name), and the entry devices will automatically be enumerated based on a primary name. Then, the user can automatically configure the detected entry devices using Bluetooth or any other short-range communication link.

Figure 11:
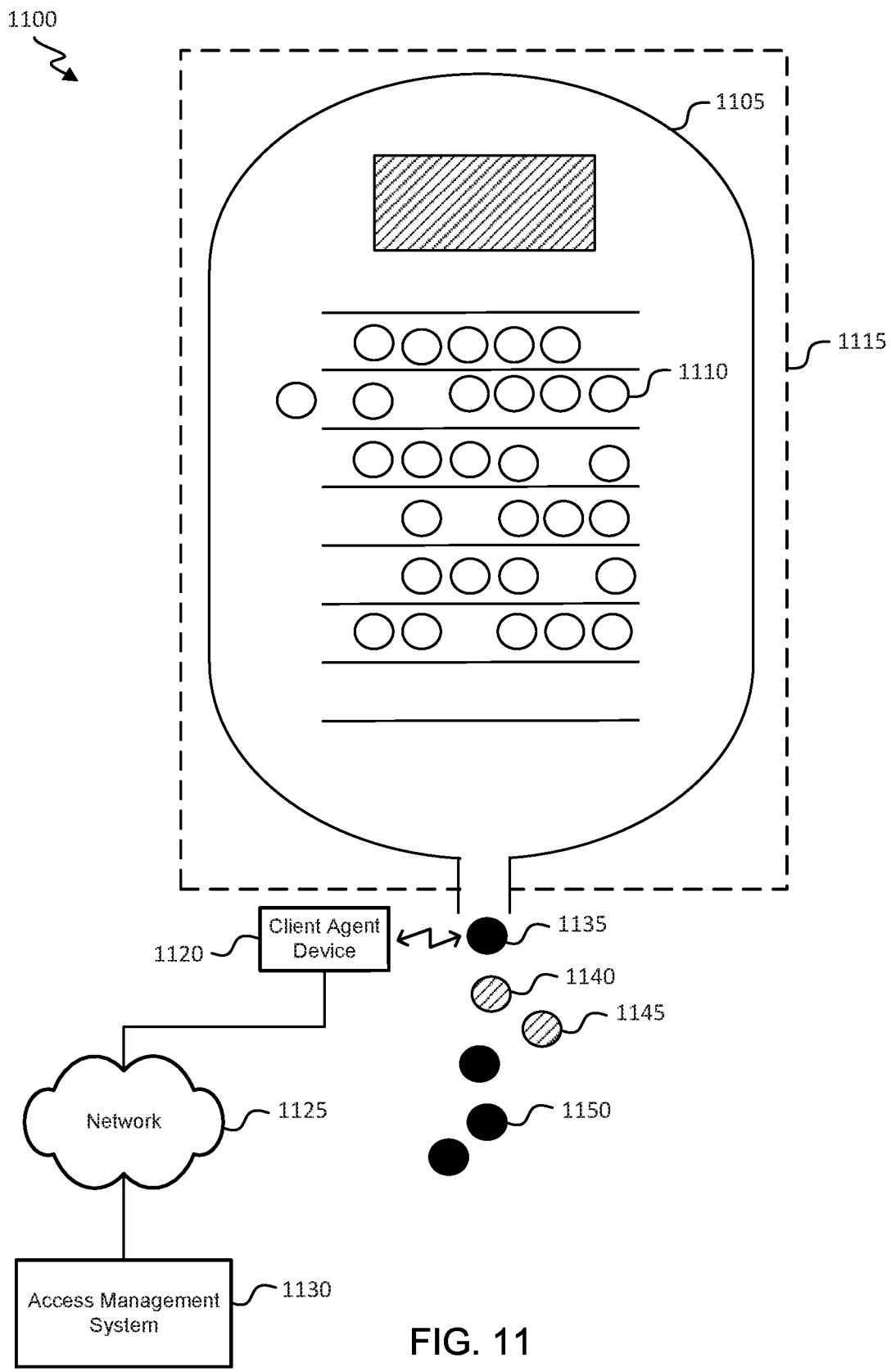
FIG. 11 is a diagram illustrating an embodiment of an interaction system.

FIG. 11 is a diagram illustrating interaction system 1100, which includes defined location 1105 (e.g., a venue). Defined location 1105 may be a building or spatial region for which users can ingress and/or egress during a defined time period (e.g., during an event). Further, defined location 1105 may include users represented by the circles within defined location 1105. For example, user 1110 may have gained entry to defined location 1105 using a valid access right to an event. Each of the users gaining entry to the defined location 1105 or seeking to gain entry to defined location 1105 can be associated with a user device. The users can gain entry into defined location 1105 by passing client agent device 1120. For example, client agent device 1120 can be an entry device configured to establish short-range communication links with the user devices.

In some instances, client agent device 1120 can be connected to access management system 1130 via network 1125. Access management system 1130 can store and manage access rights to defined location 1105 for the event. Each user can be associated with an access right (e.g., a ticket, electronic or physical), which can be used to enter defined location 1105. In some instances, access management system 1130 may store a token that uniquely corresponds to an access right or a group of access rights. An example of a token can include a token value (e.g., a string of digits, letters, and/or characters).

In some instances, gaining entry to defined location 1105 can include providing a user device in close proximity to client agent device 1120. For example, user 1135 may be seeking entry into defined location 1105. User 1135 can be associated with a user device. User 1135 is hereinafter referred to as user device 1135 as each user must present a user device at client agent device to gain entry to defined location 1105. Prior to the event hosted at defined location 1105, user device 1135 can store a token representing the access right to defined location 1105. For example, user device 1135 could have previously accessed access management system 1130 to request assignment of the access right to defined location 1105. Requesting assignment may correspond to requesting that the access right be assigned to the user device, such that the access right grants the user device (and the corresponding user) access to the event. In response to the access-right assignment and in advance of the event hosted at defined location 1105, access management system 1130 can transmit the token to user device 1135, which can store the token locally on user device 1135.

It will be appreciated that, if a user does not have a user device, the user can present a physical document representing an access right to gain entry into defined location 1105. In these instances, the physical document can include an RFID chip which stores the token value corresponding to the user's access right.

When seeking entry to the event hosted at defined location 1105, user device 1135 can be presented to client agent device 1120. In some instances, client agent device 1120 can automatically detect that user device 1135 is present within a defined vicinity of client agent device 1120 (e.g., five feet, 10 feet, 20 feet, and so on). In these instances, client agent device 1120 may transmit or broadcast a beacon message requesting an acknowledgment if received at a user device. For example, client agent device 1120 can transmit the beacon messages over short-range communication channels, such as Bluetooth, WiFi, Zigbee, RFID, and other suitable short-range communication protocols. In other instances, client agent device 1120 can initiate establishing a short-range communication channel with user device 1135 based on a request received from user device 1135 when user device is physically located within a defined vicinity of client agent device 1120.

Upon establishing the short-range communication link between client agent device 1120 and user device 1135, user device 1135 can transmit the stored token to client agent device 1120 over the short-range communication channel (represented by the bidirectional arrow). Client agent device 1120 can receive and process the token representing the access right granting user device 1135 entry into defined location 1105. Processing the token can include accessing access management system 1130 to verify that the received token corresponds to a valid token and/or access right to the event. If processing the token results in an indication that the token is valid, user device 1135 (e.g., the user associated with user device 1135 and the user device itself) can be permitted entry into defined location 1105. If processing the token results in an indication that the token is invalid (or that no token exists on user device 1135), the user associated with user device 1135 can be denied entry into defined location 1105.

It will be appreciated that the short-range communication occurring between client agent device 1120 and user device 1135 can occur, such that user device 1135 does not have to display a code (e.g., an access identifier, QR code, and so on) that represents the access right. The short-range communication between client agent device 1120 and user device 1135, during which the token representing the access right is transmitted to client agent device 1120, can occur without presentation of an access identifier. Advantageously, interaction system 1100 facilitates the invisible transmission of the token without the need to present an access identifier to a scanning device. Further, the transmission of the token can be performed by providing user device 1135 (which stores the token value) within a defined vicinity of client agent device 1120.

In some instances, the token stored on user device 1135 can be associated with additional information. Additional information can include information that further characterizes or describes the user associated with user device 1135. Examples of additional information can include previous events attended at defined location 1105 by the user the user's favorite team(s), the user's preferred area within the defined location, specifications characterizing user device 1135 (e.g., type of mobile device, operating system, etc.), a list of friends of the user (e.g., the list being extracted from social media platforms, such as Facebook, Twitter, and the like, or inputted directed by the user), a phone number associated with user device 1135, account settings associated with user device 1135 (e.g., privacy settings, indications of whether user device 1135 is open to receiving text messages or push notifications during the event), and other suitable information. The additional information can be entirely stored locally on user device 1135, stored at least in part locally and in part remotely on one or more remote servers, or stored entirely on one or more remote servers (e.g., requiring queries be transmitted to the remote servers for retrieving the additional information). For example, the additional information can be generated by a native application stored on user device 1135. The native application can manage the additional information and facilitate the updating or modification of the additional information.

In some instances, the additional information associated with the token can be stored on user device 1135. For example, when user device 1135 is in the defined vicinity of client agent device 1120, user device 1135 can transmit the token along with the additional information stored on user device 1135 to client agent device 1120. Client agent device 1120 can process the additional information and perform tasks based on processing the additional information. In some instances, access management system 1130 can determine whether or not certain messages or push notifications are to be transmitted to user device 1135. For example, if the user associated with user device 1135 is attending a sporting event, access management system 1130 can transmit various messages relating to the sports team to user device 1135 during the event. As another example, if the user associated with user device 1135 generally is located in a particular area within defined location 1105, access management system 1130 can determine transmit various messages to user device 1135 relating to services provided near the user's location.

In some instances, the additional information can include identifiers of other user devices that are associated with the token. For example, the token stored on user device 1135 can be associated with user devices 1140 and 1145, which represent users who are attending the event at defined location 1105 with user device 1135. Tokens can represent more than one access right to defined location 1105. User device 1135 can transmit one token that represents a plurality of users (or user devices), or multiple tokens, such that one token corresponds to one access right. In the situation where a group of users attend an event, a first user of the group of users can store the token(s) for each of the group of users on the user device associated with the first user.

Following this example, when user device 1135 transmits the token(s) to client agent device 1120 for user devices 1140 and 1145, client agent device 1120 can permit entry to defined location 1105 to each of user devices 1135, 1140, and 1145. In some instances, client agent device 1120 can process the received token to determine the identity of the associated users (in this case, user devices 1140 and 1145). Upon determining the identity of the users associated with the token, client agent device 1120 can transmit verification data to user devices 1140 and 1145 to facilitate entry to defined location 1105. For example, client agent device 1120 can receive the token from user device 1135 and determine that user device 1135 can enter defined location 1105. Further, client agent device 1120 can identify that user devices 1140 and 1145 are also associated with the received token, and transmit verification data directly to user devices 1140 and 1145 over short-range communication links. For example, verification data can be image data transmitted from client agent device 1120 to user devices 1140 and 1145 that, when received at user devices 1140 and 1145 causes these user devices to display a certain image or text. The users associated with user devices 1140 and 1145 can simply show a client agent managing client agent device 1120 the image corresponding to the verification data in order to be permitted to enter defined location 1105. In other instances, client agent device can separately (e.g., optically) scan the images displayed on user devices 1140 and 1145 in order to permit entry to the users.

It will be appreciated that user devices 1135 is represented as a solid black circle in FIG. 11 because the token has yet to be scanned, or is being scanned in this example illustration. Further, user devices 1140 and 1145 are illustrated as patterned circles because the user devices are associated (or in the same group) with user devices 1135. User device 1150 represents remaining user devices associated with users waiting in line to provide tokens to client agent device 1120. Remaining user devices 1150 are represented as solid black circles because these users have not been permitted entry to defined location 1105 yet.

Figure 12:
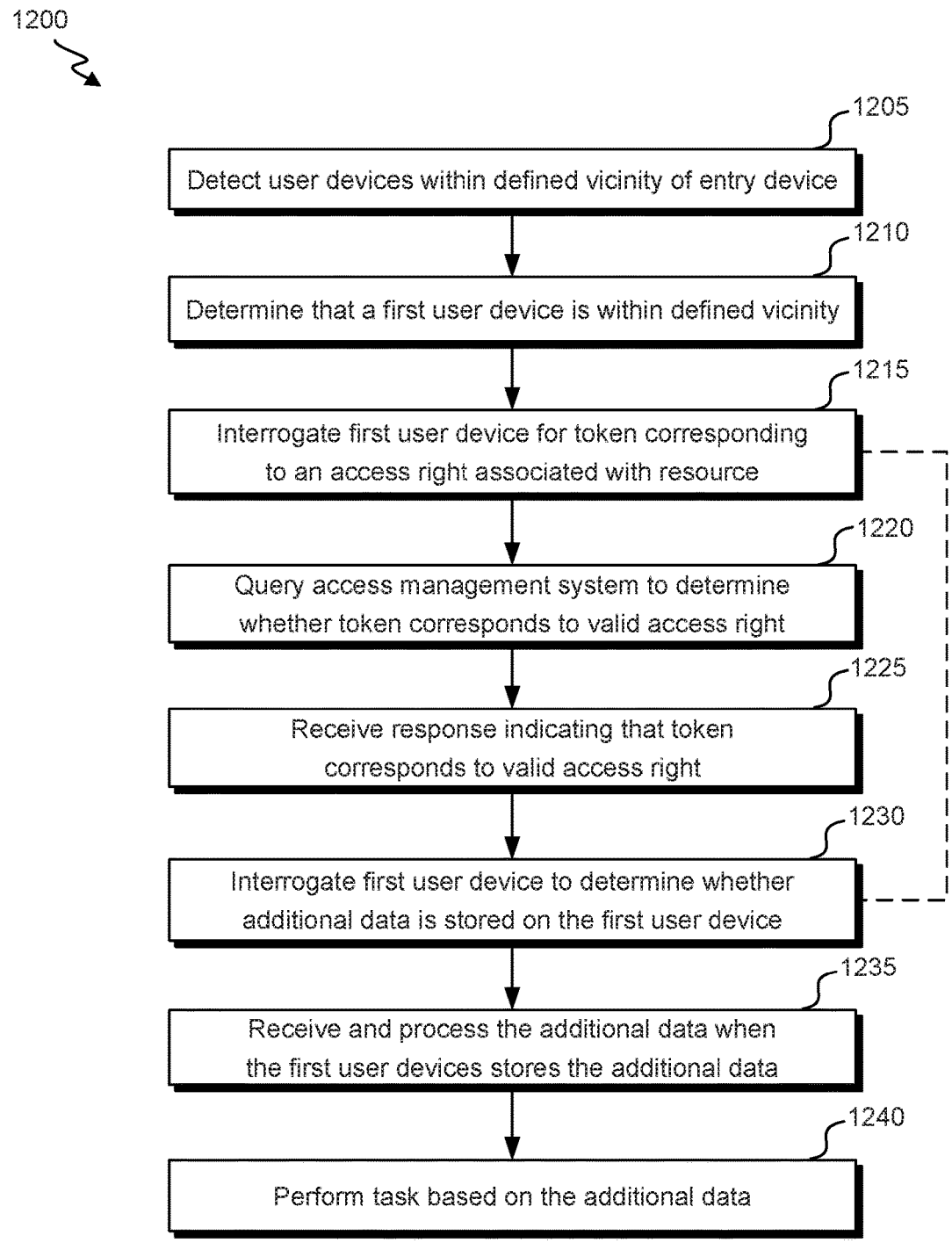
FIG. 12 is a flowchart illustrating an embodiment of a process for facilitating entry to a defined location.

FIG. 12 is a flowchart illustrating an embodiment of process 1200 for facilitating entry to a defined location. Process 1200 can be performed at least partly at any of an access management system (e.g., access management system 185), a client agent device (e.g., client agent device 170), or a user device (mobile or non-portable). Further, process 1200 can be performed at an entry point to a defined location (e.g., defined location 1105) to determine whether a user is permitted to gain entry to the defined location.

At block 1205, the client agent device can detect whether user devices are physically located within a defined proximity to the client agent device. In some instances, the client device can determine whether there are any user devices within five, ten, twenty, etc. feet of the client agent device. For example, the client agent device can broadcast beacon messages via short-range communication channels. The broadcasted beacon messages can have a predetermined range. The predetermined range can be the defined proximity of the client device. For example, if the range of the broadcasted beacon messages transmitted over Bluetooth is 30 feet, then the client device can detect whether there are any user devices within 30 feet of the client device. In some instances, the client device can be positioned at an entry point to the defined location so that users must pass the client agent device to gain entry to the defined location.

At block 1210, the presence of a first user device can be detected within the defined vicinity of the client agent device. For example, when the first user device is physically located within the defined vicinity of the client agent device, the first user device can receive the broadcasted beacon messages transmitted by the client agent device. Upon receiving the broadcasted beacon messages, the first user device can transmit an acknowledgment message back to the client agent device. The acknowledgement message can include various information identifying the first user device (e.g., the type of user device, and/or other device characteristics).

At block 1215, the client agent device can interrogate the first user device for a token corresponding to an access right associated with the resource. For example, the client agent device can transmit a communication to the first user device (e.g., using the information included in the acknowledgement message), and the first user device can respond to the received communication by transmitting the token, which is stored in the first user device, to the client agent device.

At block 1220, the client agent device can query the access management system to determine whether the received token corresponds to a valid access right. For example, the access management system can store all access rights (e.g., a code representing an access right for all access rights) and identifiers of all tokens corresponding to the stored access right codes. The client agent device can query the access management system for an access right corresponding to the token received at block 1225. For example, the access management system can use a lookup table to determine whether the received token corresponds to a valid access right.

At block 1225, the client agent device can receive a query response from the access management system. For example, the response to the query can include an indication indicating that the token corresponds to a valid access right. If the access management does not store an access right corresponding to the token, then the response can include an indication that the token is either erroneous or does not correspond to an access right for the particular event at the defined location.

At block 1230, when the client agent device receives a response from the access management system indicating that the token corresponds to a valid access right, the client agent device can interrogate the first user device for additional data or information. For example, additional data can include information inputted by a first user operating the first user device. The additional data can be inputted via a native application executed on the first user device. Examples of additional data can include the first users favorite team, list of friends attending the event or not attending the event, a balance of credit associated with the first user, an flag indicating whether or not the user has requested assignment (or been assigned) a series of access rights (e.g., season tickets), the number of access rights remaining for the series of access rights, a list of additional users attending the event with the first user, pictures or video captured by the first user device, contact information of other users stored on the first user device, customization settings, and other suitable data. The additional data can be stored locally on the first user device. In some instances, block 1230 can be performed together with block 1215 (as represented by the dashed line in FIG. 12). For instance, the client agent device can interrogate a user device for the token data and any available additional data at the same time. In this example, a string of data including both the token and the additional data can be transmitted from the user device to the client agent device over the established short-range communication link. In FIG. 12, the example of performing block 1230 together with block 1215 is represented by the dashed line. At block 1235, the client agent device can receive and process the additional data. Processing the additional data can include performing one or more operations using or based on the additional data, routing the additional data, and so on.

At block 1240, the access management system or a local system (i.e., local to the defined location) can perform one or more tasks based on the additional data. Examples of tasks that can be performed include selectively transmitting messages to a group of users (e.g., users having the same favorite sports team, users located in a particular geographical location within the defined location, users having a particular membership status, etc.), sending push notifications to users (e.g., notifications identifying various offers of items or services located near the user's location), identifying the locations of other users associated with the user who are also attending the event at the defined location on an interactive access map displayed on the first user device, and other suitable tasks.

In some instances, an interactive access map can be a visual representation of all of the access locations (e.g., seats) in the defined location. For example, the interactive access map can show all of the access locations in the defined locations and can be segmented into various sections. The interactive access map is interactive in that selecting an access location displayed on the interactive access map can initiate a communication session with the user device associated with the access location.

It will be appreciated that tokens cannot be counterfeited because a token stored in the first user device represents a valid access right in lieu of a visible access identifier. The access management system can manage all of the tokens so that an access right can be transferred only by using a native app or website associated with the access management system or a predetermined entity. As another example, all of a user's tokens can be stored in Apple's Passbook or the Android equivalent.

Figure 13:
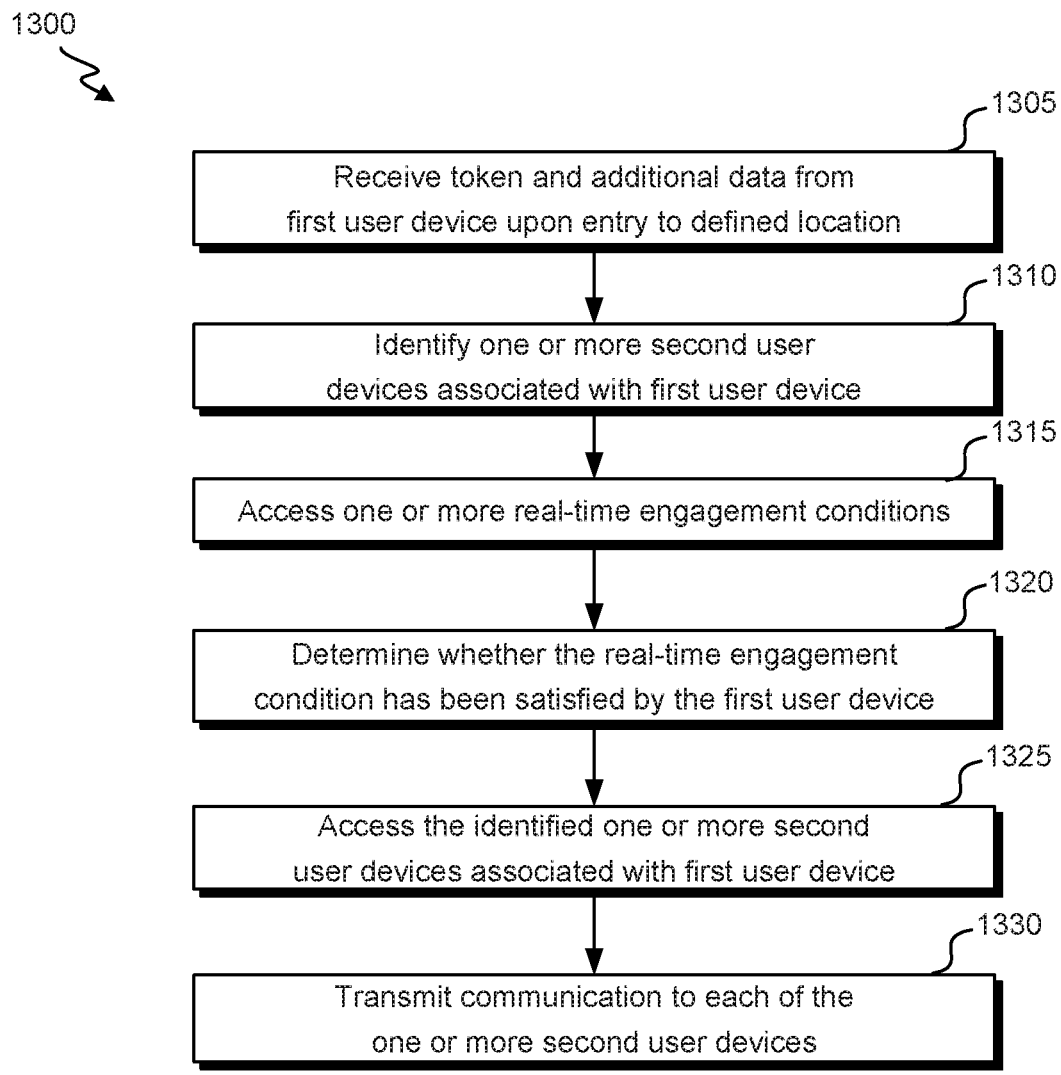
FIG. 13 is a flowchart illustrating an embodiment of a process for establishing real-time engagements with users within a defined location during an event.

FIG. 13 is a flowchart illustrating an embodiment of process 1300 for establishing real-time engagements with users within a defined location during an event. Process 1300 can be performed at least partly at any of an access management system (e.g., access management system 185), a client agent device (e.g., client agent device 170), or a user device. Further, process 1300 can be performed to selectively transmit communications and/or push notifications to user devices located with a defined location based on various information associated with the user devices.

At block 1305, token and additional data can be received from a first user device upon entering the defined location. For example, the first user device can communicate with the client agent device at an entry point of the defined location. The first user device can transmit the locally-stored token and additional data associated with the first user operating the first user device. The token can be associated with a valid access right to the defined location for an event. The additional data can be generated by the first user operating the first user device at a native app operating and being executed on the first user device.

At block 1310, one or more second user devices that are associated with the first user device can be identified. For example, a first user can request assignment (and subsequent complete a process for assigning) a group of access rights for a group of users (including the first user). The access rights may or may not correspond to contiguous access locations at the defined location. In this example, the access management system may transmit one or more tokens to the first user device to represent the access rights of the group of users. The group of users may arrive together or separately to the defined location. In some instances, when the token is received from a first user device upon entry of the first user to the defined location, the client agent device may access a lookup table stored in the access management system for a list of any additional users associated with the token (e.g., the group of users for which the access rights were assigned). The client agent device can receive a query response from the access management system. The query response can include a list of all of the group of users associated with the token who are attending the event.

At block 1315, one or more real-time engagement conditions can be accessed. For example, a plurality of real-time engagement conditions can be stored in the access management system. A real-time engagement condition can correspond to a condition, which when satisfied for a particular user device, triggers a communication initiation to one or more user devices that are associated with the first user device (e.g., user devices corresponding to the second users who are attending the event with the first use). Examples of a real-time engagement condition can include a signal indicating that the first user operating the first user device is missing, incapacitated, or intoxicated; a signal indicating that the first user requests that the second users associated with the first user be contacted or located; a signal indicating that service being offered is now available; a signal indicating that food or beverage items are available; and other suitable conditions. In these examples, when the signal is received, the real-time engagement condition can be satisfied. Using the example of the first user being intoxicated, the real-time engagement condition would be that the first users friends (e.g., second users who are attending the event) are contacted. The second user devices may or may not be currently attending the same event as the first user device.

In some instances, when a first user is looking for a second user (e.g., the second user being associated with the same token as the first user), the first user can transmit a signal to the a client device (e.g., client register, client point device, client agent device, or other device within or not within the defined location) to locate the second user. In these instances, the client device can facilitate transmission of a communication to the second user device using process 1300.

In some instances, process 1300 can be performed for a defined location manager for marketing or security purposes. For example, a defined location manager can select various access locations in the defined location using the interactive access map, and initiate communication with those selected users. In this example, the communication can include an offer for an item or service. In other examples, initiation transmission of engagements or communications to users within the defined location can be performed automatically based on defined rules. For example, if the system determines an entry event for a user device, the system can transmit an offer for food or beverage to the user device.

At block 1320, the real-time engagement condition is determined to have been satisfied with respect to the first user device. For example, if the first user is intoxicated, the real-time engagement condition has been satisfied because there is a need to contact the second user devices associated with the first user device, regardless of the second user devices are attending the current event or not. At block 1325, the access management system can retrieve the previously identified second users. For example, the phone numbers of each of the second user devices associated with the first user device can be retrieved.

At block 1330, a communication can be transmitted to each of the second user devices using the identification information of each of the second user devices. For example, a text message can be transmitted to the identified phone number of each of the second user devices. It will be appreciated that the second user devices may or may not be currently attending the same event as the first user device. For example, a second user associated with a second user device may be an emergency contact for the first user associated with the first user device. As another example, the second user associated with the second user device may be a user (with an access right to the event) who is attending the event together with the first user.

Figure 14:
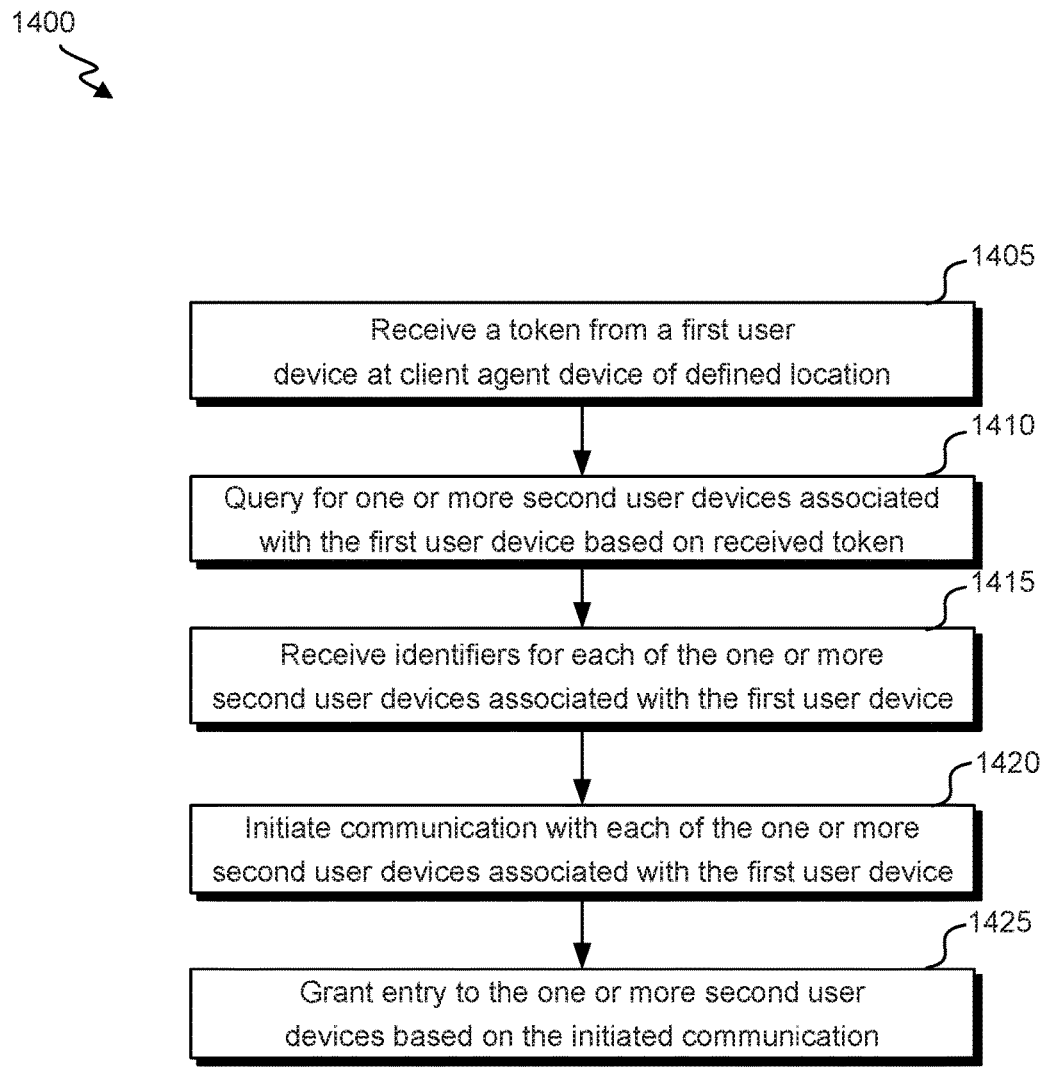
FIG. 14 is a flowchart illustrating an embodiment of a process for facilitating group entry to an event hosted at a defined location.

FIG. 14 is a flowchart illustrating an embodiment of process 1400 for facilitating group entry to an event hosted at a defined location. Process 1400 can be performed at least partly at any of an access management system (e.g., access management system 185), a client agent device (e.g., client agent device 170), or a user device (mobile or non-portable). Further, process 1400 can be performed to facilitate entry to an event for a group of users without having to individually access a token on the user device of each user. For example, where a first user completes an assignment process for assigning access rights to a group of users (including the first user), the user device associated with the first user can store the token the represents the access rights for the group of users. Process 1400 can be performed to facilitate entry to a defined location for the group of users who are waiting in line with the first user at the entry point. In some instances, process 1400 can also be used.

At block 1405, the token data can be received at a client agent device located at an entry point to a defined location. The token can be received from a first user device at the time the first user device is located within a define vicinity of the client agent device. For example, the first user associated with the first user device can be waiting in line to enter a defined location with a second user associated with the second user device. At block 1410, the client agent device can query the access management system to identify one or more second user devices associated with the token of the first user device. For example, the client agent device can access a lookup table stored at the access management system to find any second user devices affiliated or associated with the token of the first user device.

At block 1415, the client agent device can receive a response to the query. For example, the response can include identifiers that uniquely identify each of the one or more second users (or second user devices) associated with the first user device. Example of identifiers can include a phone number, email address, device identifiers (e.g., a MAC address), and IP address, an address of a hardware component of the second user device, Facebook account, Twitter account, other social media accounts, native application stored on the second user device, and other suitable identifiers.

At block 1420, the access management system can initiate a communication with each of the one or more second users. In some instances, the access management system can initiate a communication with a second user device by transmitting an email, sending a push notification to the native application, making a voice over IP phone call to the user, sending a text message, sending a messing or posting a message on the second user's social media account (e.g., Facebook, Twitter, etc.). In other instances, when the second user device is located in proximity to the client agent device (e.g., when a second user is waiting in line with the first user at the entry point to the defined location), the client agent device can transmit a communication to the second user device using a short-range communication link. For example, the client agent device can also initiate a communication with a second user device in proximity by sending a message over Bluetooth, Zigbee, Near Field Communication (NFC), and the like.

Examples of the content of the communications initiated by the access management system and/or the client agent device can include an image, text, a hyperlink, a code (e.g., access identifier, QR code, and the like), or any combination thereof. The image and/or text can represent the access right associated with the second user or second user device. For example, the access management system can transmit a text message or a push notification to a second user device (e.g., a user device of a friend of the first user) that is located near the first user device. In this example, the first user device stores the token that represents the access rights for the first user and each of the second users. Non-limiting examples of the message can include a push notification to the native applications of the second user device that reads "Press here to redeem," "Press here to show your ticket to the gate agent," and other suitable messages.

At block 1425, the one or more second users can be granted entry to the defined location based on the initiated communication. Using the example above, if the initiated communication is a push notification to a native application running on a second user device, which displays a message of "Here is your access right to enter the defined location," the second user can simply show the message or representation of the access right displayed with the message to a gate agent to gain entry to the defined location. In some instances, the message can be presented with a scannable code (e.g., access identifier or QR code) on the second user device, and the scannable code can be scanned by the client agent device.

It will be appreciated that, in another embodiment, the second users who are associated with the token can also simply walk in to the defined location together with the first user after the client agent device receives the token stored on the first user device (e.g., over a short-range communication link or channel). In this example, the second users would not have to show anything on their user devices (i.e., the second users would not even have to bring user devices to the defined location). For example, if a first user were standing in line with two friends (also attending the event) at an entry point to the defined location, the first user can present the first user device (which stores the token, or which stores a link to the token) to the client agent device. In this example, the token represents multiple access rights to enter the defined location (e.g., an access right for the first use and an access right each for the two friends). The client agent device can transmit a request to the first user device for the token, and then the first user device can transmit a response including the token. When the client agent device processes the token, the client agent device (or the gate agent operating the client agent device) is notified that the first user and the two friends can pass through the entry point into the defined location. In this example embodiment, the two friends do not have to show their user devices to the gate agent.

It will also be appreciated that, in another embodiment, the second users do not need to wait in line at the entry point of the defined location together with the first user who is operating the first user device, which stores the token that represents all of the access rights to the defined location for the first user and each of the second users. For example, the second users can arrive at the event at separate times and present their user devices at the client agent device or to a gate agent. In this example, a second user device may have received a push notification or text message with information representing the associated second user's access right.

It will also be appreciated that, in another embodiment, the client agent device can establish a short-range communication link with the second user device that is waiting in line with the first user device. For example, the client agent device can establish a Bluetooth communication channel between the client agent device and the second user device. The client agent device can use the information included in the response received at block 1415 to establish the short-range communication link. For example, the client agent device can use the device identifier of the second user device to establish a short-rage communication channel with the client agent device. In this embodiment, the client agent device can interrogate each of the one or more identified second user devices for a device identifier of the second user device. For example, if there are three second user devices associated with the first user device, the client agent device can establish a short-range communication link with each of the three second user devices, and interrogate each of the three devices for a device identifier. The client agent device could have previously identified a device identifier that uniquely identifies a second device. The device identifiers received can identify which second user devices should be attending the event with the first user device. The client agent device can interrogate the second user devices that showed up at the defined location to determine whether the device identifiers of these second user devices are the same as the device identifiers of the second user devices received.

Further, it will also be appreciated that the access management system can compare the previously identified device identifiers with the interrogated device identifiers, and determine if there is a match. If so, the second user can be permitted to enter the defined location. For example, the comparison can be performed while the second user associated with a second user device is waiting in line to gain entry to the event at an entry point. For example, the second user can simply walk through the entry point, and the comparison can be performed over short-range communication links without the need for the second user to even display his or her phone at the client agent device. As long as the second user device is within the defined vicinity of the client agent device, the comparison can be performed. If the comparison results in a match, a notification can be performed at the client agent device or a device associated with the client agent device (e.g., an audio notification can be outputted from a speaker, or a visual notification can be displayed on a screen). If the comparison does not result in a match, then the second user can be sent to a gate agent to complete an assignment process to obtain a valid access right for the event prior to gaining entry. Similarly, an audio or visual notification can be presented to the second user if there is no match. Examples of a device identifier can include a MAC address, phone number, email address (e.g., associated with the first user of the first user device), and other suitable identifiers of devices.

It will be appreciated that, once the access management system has identified the one or more second user devices associated with the first user device at block 1410, the access management system can simply transmit verification data to each of the one or more second user devices. For example, verification data can be an image or text data transmitted from the client agent device to the second user device, such that when the verification data is received at the second user device, the verification data causes the second user device to display the image and/or text. The second user can present the second user device, which is displaying the image or text, to a gate agent operating the client agent device to gain entry to the defined location. In these examples, the second users are waiting in line near the client agent device (as shown in FIG. 11 for example) with the first user device to gain entry to the defined location.

Figure 15:
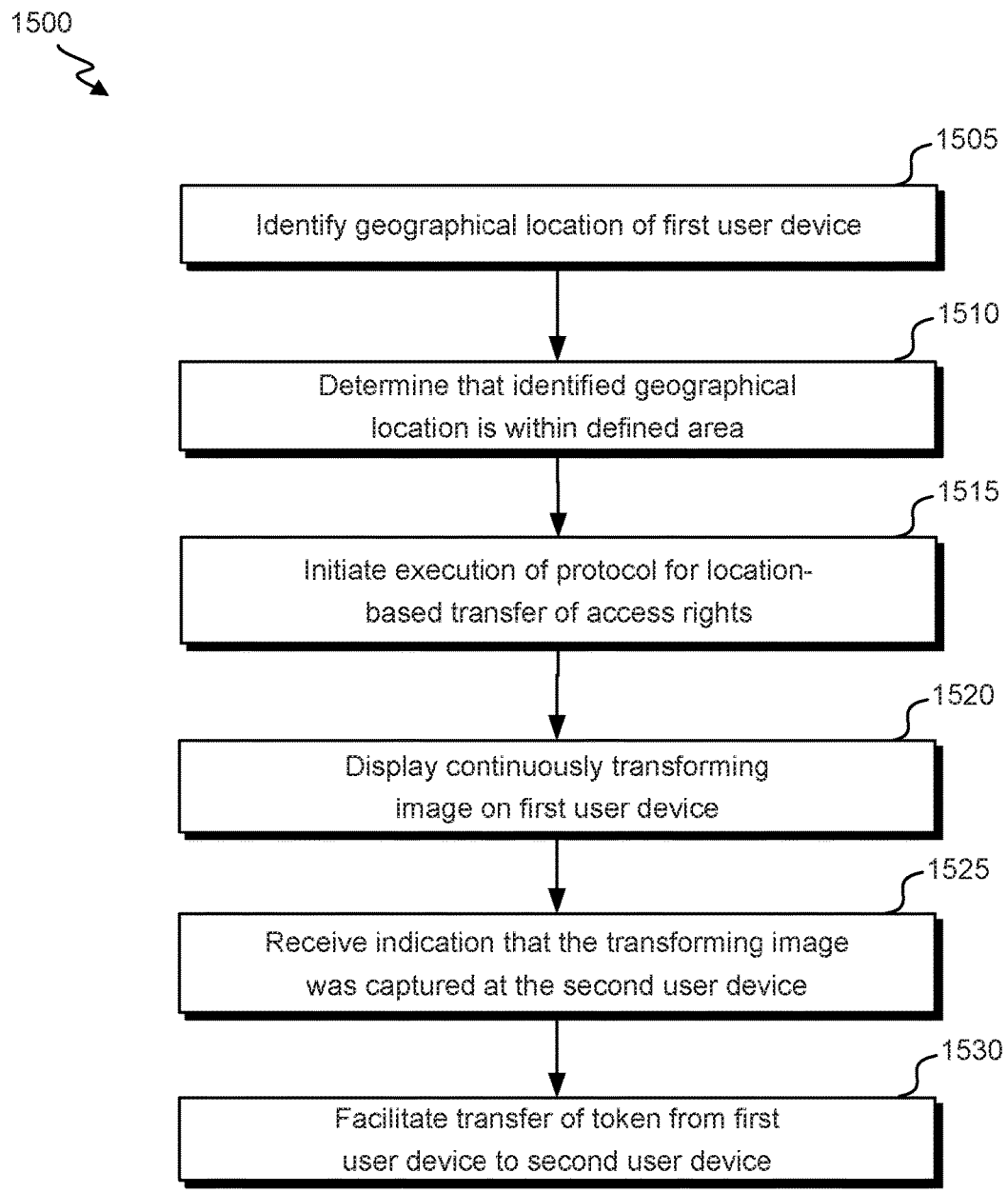
FIG. 15 is a flowchart illustrating an embodiment of a process for facilitating post-entry transfer of access rights.

FIG. 15 is a flowchart illustrating an embodiment of process 1500 for facilitating post-entry transfer of access rights. Process 1500 can be performed at least partly at any of an access management system (e.g., access management system 185), a client agent device (e.g., client agent device 170), or a user device. Further, process 1500 can be performed to facilitate transferring of the token or access right from the first user device to the second user device after the first user and the second user have entered the defined location. Tokens and access rights have been described above, however, a locator can be a representation of the second user's access location (e.g., an access identifier to be scanned or an identifier of the access location).

In process 1500, the first user associated with the first user device and the second user associated with the second user device entered the defined location together. For example, the first user device stored a token that represented access rights for both the first user and the second user. In some instances, because the first user device stores the token and the second user device does not store the token, the second user can use process 1400 to gain entry to the event, whereas, the first user can use process 1200 to gain entry to the event. In these instances, if the second user wishes to leave a designated area (e.g., a VIP area) the second user will need to re-present the token or access right to gain re-entry to the designated area. However, in this situation, the token representing the access right is stored on the first user device and not the second user device. Process 1500 can be used to transfer the token from the first user device to the second user device so that the second user can leave the designated area and return without issue.

At block 1505, the access management system can identify a geographical location of the first user device. In some instances, the first user device can include a global positioning system (GPS) device to determine a physical location of the first user device. In other instances, the access management system can use triangulation techniques (e.g., using the Wi-Fi hot spots to which the first user device is connected) to determine a geographical location of the first user device. In some instances, the geographical location of the first user device can be determined using third-party applications (e.g., "checking in" to a location using Facebook). It will be appreciated that the geographical position of the first user device can be determined using any number of techniques.

At block 1510, the access management system can determine that the geographical location identified at block 1505 is within a defined area. For example, the defined area can be the entire area of a defined location (e.g., defined area 1115 of FIG. 11). In some instances, the defined area can be a region within the defined location area. The access management system can compare the geographical location of the first user device with the boundary of the defined area, and if the geographical location is within the boundary, then the access management system can determine that the first user device is within the defined area. It will be appreciated that, instead of detecting a geographical location of the first user device, the access management system can detect whether an entry event has occurred. An entry event can correspond to the first user device exchanging communication with a client agent device located at the defined location. In this example, the protocols for transferring access rights, tokens, or access rights can be available to the first user when the entry event for the first user device has been detected.

At block 1515, execution of one or more protocols for transferring the token or access right to a second user can be initiated only when the access management system has determined that the first user device is within the defined area. For example, the ability to use the feature of transferring the token or access right can be based on the location of the first user device. If the first user device is outside of the defined area, then the feature of transferring the token or access right is not available, however, if the first user device is within the defined area, then the feature of transferring the token or access right will be or is available for use by the first user device.

In some instances, initiating execution of the protocol for location-based transfer can include presenting a selectable button on a native application executed on the first user device. The selectable button displayed on the first user device can be selected by the first user touching or tapping the selectable button. The selection of the selectable button can trigger one or more operations performed on the first user device to facilitate the transfer of the token or access right.

At block 1520, as part of the protocol for location-based transfer, the first user device can display a continuously transforming image. In some instances, the image can be periodically transformed (e.g., every three seconds), and in other instances, the image can continuously be transformed. Displaying the transforming image can facilitate transferring of the token from the first user device to the second user device. For example, the second user device, which is in close proximity to the first user device, can capture the transforming image displayed on the first user device, for example, with a camera of the second user device. Capturing the transforming image with the second user device can cause the second user device to generate the token that was stored on the first user device. In some instances, the transforming image can be a transforming QR code that, when captured at the second user device, causes the second user device to generate the token that was originally stored on the first user device. Now, the second user device stores the token representing the access right of the second user, thereby enabling the second user to leave the designated area and re-enter the same area by either displaying a representing of the token to a gate agent or having the second user device communicate the token to a client agent device located at the entry point of the designated area.

In some instances, as part of the location-based access-right transfer protocol, the first user device can optically display a constantly transforming image, and the second user device can use a camera (which is connected to the second user device) to capture an image of the transforming image. The camera and the native application running on the second user device can be configured to process the captured image data to understand the value that the image represents. The value can correspond to the token that represents the multiple access rights. Upon determining the value represented by the captured image, the token would be transferred from the first user device to the second user device over a short-range communication link. In other instances, the second user device would simply store the value generated by analyzing the captured image, and that stored value would represent the token. In some instances, only one device may store the token at a time, so when the first user device transfer the token to the second user device at the defined location, then the first user device will no longer have the token. For example, the token can be temporarily or permanently invalidated on the first user device using an invalidation code.

Processing the captured image at the second user device to generate the token value can include determining various positions of the captured image, and using an algorithm to convert the determined positions to one or more values. For example, the algorithm can determine that if pixels are present at certain positions of the captured image, then certain values can be outputted by the algorithm. The image displayed is constantly transforming to prevent fraud or unauthorized reproduction of the captured image. For example, the algorithm can generate the same token value or the same representation of the token value from any version of the transforming image (e.g., the image can be captured at any time and the same token value will be generated). In these instances, the token is transferred from the first user device to the second user device without the need for an Internet connection. The transfer can simply occur between two devices using short-range communication or optically (e.g., by displaying the transforming image) using the methods described herein. For example, transferring the token from the first user device to the second user device can include transferring a data structure including the token values from the first user device to the second user device with the second user device now owning the data structure (e.g., storing the data structure).

It will be appreciated that the instead of block 1520, the first user device can also transfer the token to the second user device via a short-range communication channel, such as Bluetooth, Zigbee, Near Field Communication (NFC), RFID, and so on. Transferring the token via short-range communication channels between the first and second user device would avoid the need for the first device having to display the transforming image and the second user device having the capture the transforming image.

At block 1525, the first user device can receive an indication (e.g., an acknowledgement message) indicating that the transforming image was successfully captured at the second user device. After receiving this indication from the second user device over a short-range communication channel, the first user device can temporarily or permanently indicate that the token has been transferred to the second user on the native application executed on the first user device. In some instances, block 1525 can be performed even if the token is transferred to the second user device via short-range communication channels.

At block 1530, the transfer of the token from the first user device to the second user device can be facilitated. For example, the second user device can store the token locally on the second user device. Further, on the native application executed on the second user device, the token can be represented by a locator (e.g., an indication of where the second user is located or seated). The second user device can now leave the designated area and return. Upon returning the second user device can present the token or a representation of the token to a gate agent or a client agent device located at the entry point of the designated area or the defined location. For example, the native application of the second user device can either display a representation of the token (e.g., an access identifier), or the native application can facilitate transmission of the token to the client agent device over a short-range communication channel.

Figure 16:
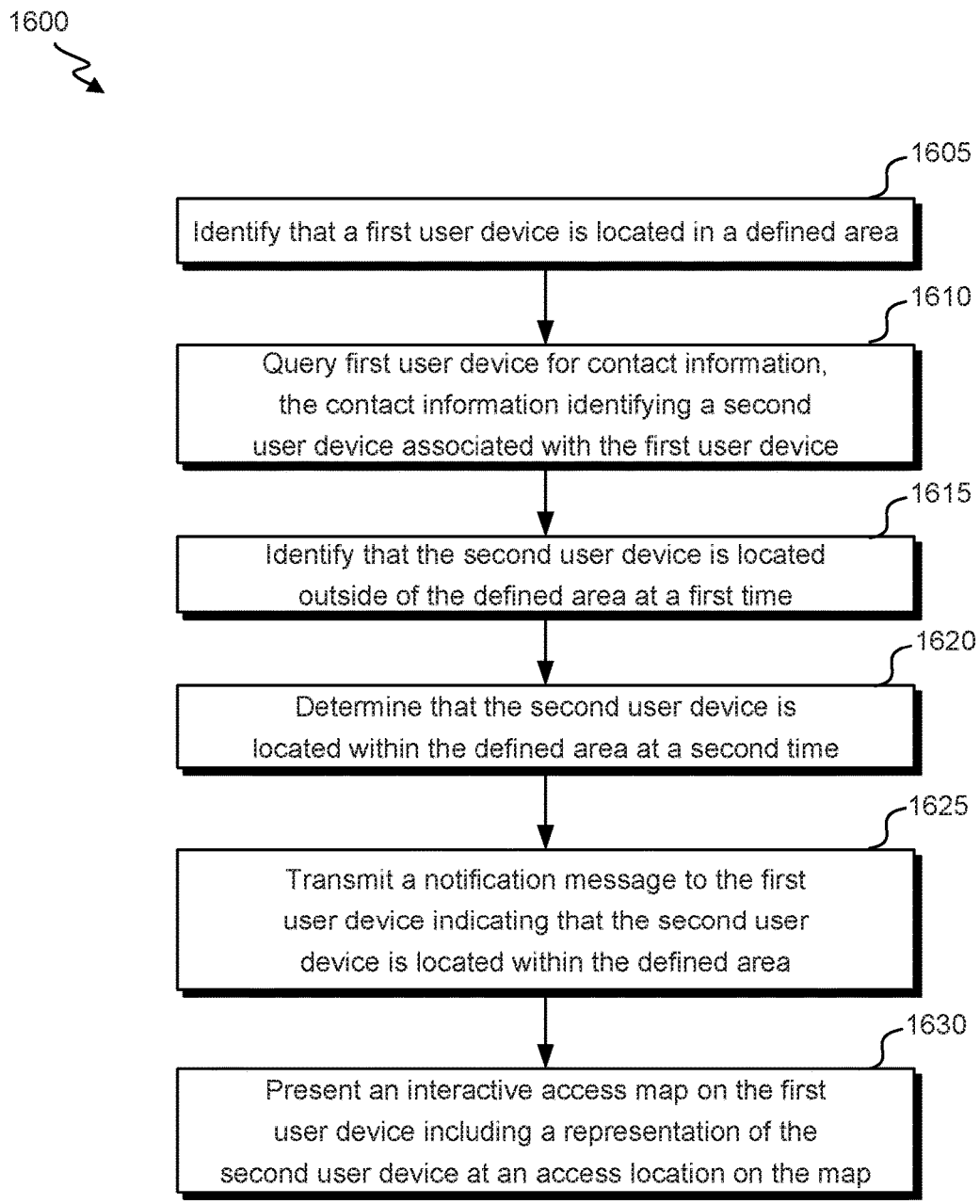
FIG. 16 is a flowchart illustrating an embodiment of a process for communicating with other users attending an event using an interactive access map.

FIG. 16 is a flowchart illustrating an embodiment of process 1600 for communicating with other users attending an event using an interactive access map. Process 1600 can be performed at least partly at any of an access management system (e.g., access management system 185), a client agent device (e.g., client agent device 170), or a user device. Further, process 1600 can enable a first user at a defined location to exchange communications with a second user at the same defined location via an interactive access map displayed on each of the first user's device and the second user's device. Process 1600 can also identify which second users to contact if a real-time engagement condition has been satisfied. For example, if a first user is incapacitated, process 1600 can be used to determine which second users to contact regarding the first user. In some instances, process 1600 can also be used to notify the first user device at the moment a second user device (e.g., a friend of the first user) has entered the same defined location in which the first user is located.

At block 1605, the first user device can be identified as being located within a defined area (e.g., the venue). For example, the access management system can determine the GPS coordinates of the first user device and determine that the GPS coordinates are within the boundary of the defined area.

At block 1610, the first user device can be queried for contact information. In some instances, the contact information can be inputted by the first user into the native application executed on the first user device. In other instances, the contact information can be determined by accessing one or more remote servers to identify the contact information associated with the first user device. Examples of contact information can include an email address or telephone number associated with a second user device (e.g., a user device of a friend of the first user), a device characteristic of the second user device (e.g., type of user device or a device identifier), and other suitable information identifying one or more second user devices that are associated with the first user device. In some instances, the contact information can identify a second user device associated with the first user device.

At block 1615, the geographical location of the second user device can be determined. For example, the access management system can identify that the second user device is located outside of the defined area at a first time. The second user who is operating the second user device can be arriving to the defined location (e.g., in the parking lot of the defined location). At block 1620, geographical location of the second user device can be continuously tracked. For example, at a second time after the first time, the access management system can identify that the second user device is now within the defined area. The second user device being inside the defined area can indicate that the second user device has passed the client agent device at the entry point of the defined location, and is now inside the defined location.

At block 1625, a notification message can be transmitted to the first user device indicating that the second user device is now located within the defined area. For example, the access management system can transmit a text message or a push notification to the first user device with a notification that the second user device is now at the defined location. At block 1630, the native application being executed on the first user device can facilitate presentation of an interactive access map, including a representation of the second user device at a position on the interactive access map. For example, the position can correspond to the access location (associated with the access right within the defined location) corresponding to the second user device. The representation of the second user device at the access location of the second user can be an icon or a thumbnail image of the second user. In some instances, the interactive access map can enable the first user device to exchange communication (e.g., one or more messages) with the second user device. For example, the first user can tap or press the icon of the second user on the interactive access map displayed on the first user device to initiate a chat session with the second user device. Upon selecting the icon of the second user device, the access management system can route messages directly to the second user device to facilitate the chat session. If the second user device transmits a response message to the first user device, the access management system can route the message to the first user device. In process 1600, the first user and the second user arrive at the defined location at different times.

Figure 17:
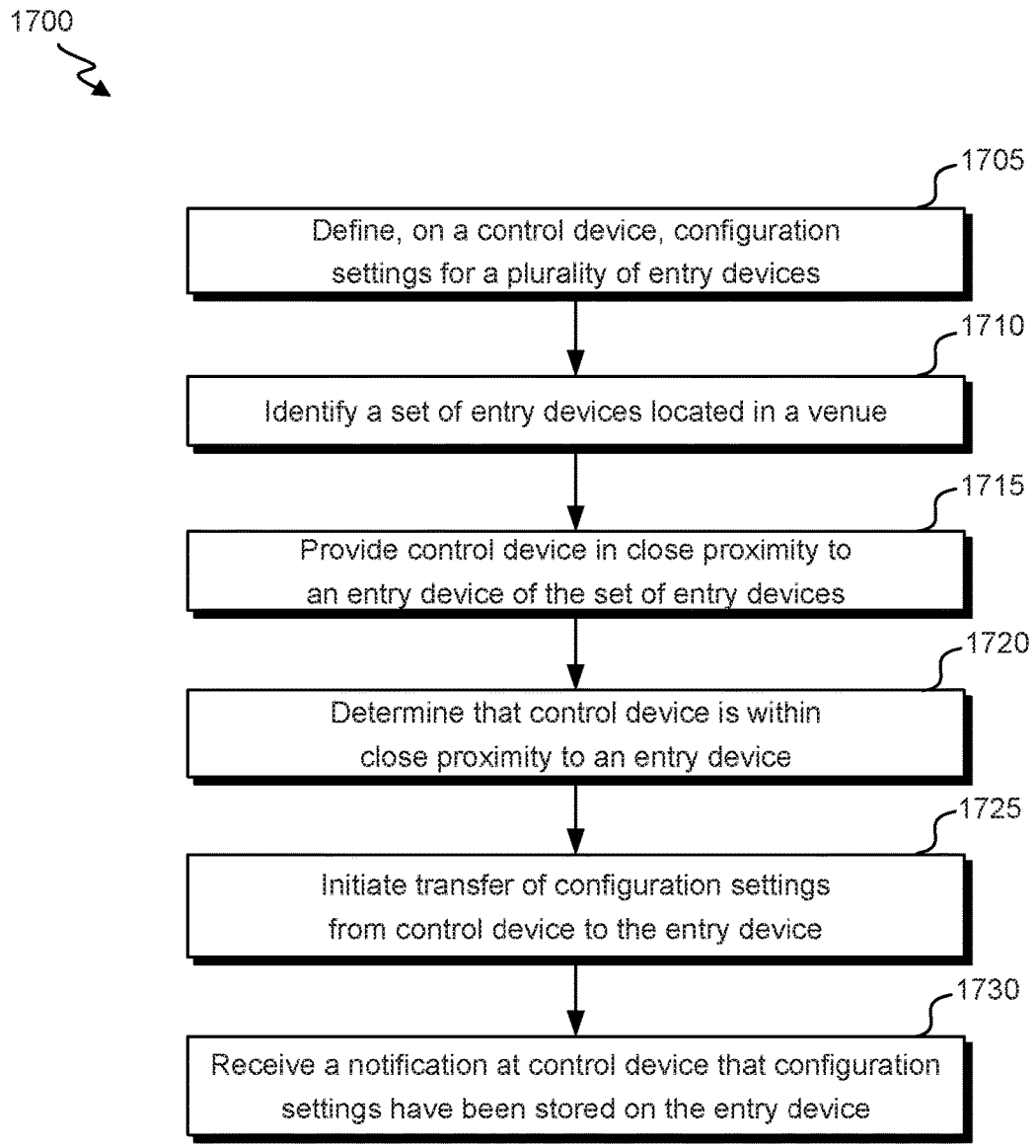
FIG. 17 is a flowchart illustrating an embodiment of a process for configuring setting for entry devices located at a defined location.

FIG. 17 is a flow chart illustrating an embodiment of process 1700 for configuring setting for entry devices located at a defined location. Process 1700 can be performed at least partly at any of an access management system (e.g., access management system 185), a client agent device (e.g., client agent device 170), a control device controlling the client agent device, or a user device (mobile or non-portable). Further, process 1700 can be performed to facilitate the configuration of some or all of the client agent devices located around the defined location.

At block 1705, configuration settings for each of a plurality of client agent devices (e.g., entry devices) can be defined. For example, a defined location manager can define the configuration settings for the client agent devices. The configuration settings can include one or more protocols for performing access right validation for events hosted at a defined location. The protocols can be general to all events, or they can be specific to the specific event being hosted at the defined location at a particular time. Defining the configuration settings can include accessing an access right management system to select one or more profiles to be applied to the event. The selected one or more profiles can be used to define the configuration settings or the one or more protocols. A control device can be used to define the configuration settings. In some instances, the control device can be a mobile device (e.g., a tablet computer) on which the defined configuration settings are stored.

At block 1710, a set of client agent devices can be identified. For example, the set of client agent devices that are identified can be the client agent devices that are located around a particular defined location. Using FIG. 11 as an example, client agent devices can be located at various entry points to the defined location. Some or all client agent devices can be mobile (e.g., table computers), and some or all client agent devices can be non-portable (e.g., kiosks). Identifying the set of client agent devices can include selecting all of the client agent devices located at a particular defined location. In some instances, the client agent devices can be selectively configured. For example, a group of the set of client agent devices can have a first configuration, and another group of the set of client agent devices can have a second configuration.

At block 1715, the control device on which the configuration settings are stored can be positioned in close proximity to a client agent device of the set of client agent devices. For example, the close proximity can be the defined range of communication for a short-range communication link (e.g., Bluetooth, NFC, RFID, and so on). At block 1720, a client agent device can determine that the control device is within close proximity. For example, the client agent device can make this determination based on beacon messages periodically broadcasted to determine which devices are within range. In some instances, the control device can determine that it is within range of short-range communication with a client entry device.

At block 1725, the configuration settings can be transferred from the control device to the client agent device over a short-range communication link. In some instances, the transfer of the configuration settings can be initiated based on tapping the control device to the client agent device. For example, tapping or pushing the configuration settings from the control device to the client agent device can be performed using near field configuration. In some instances, the control device can simply push the configuration settings to each of the set of client agent devices remotely. For example, each of the client agent devices can be connected to the Internet and can receive the configuration settings via the Internet. At block 1730, the control device can receive a notification that the configuration settings have been received and stored at the client agent device.

It will be appreciated that each client agent device can be self-healing. For example, if a client agent device temporarily goes offline, the client agent device can automatically reconfigure itself when it comes back online. For example, the client agent device can communicate with the control device or with one or more other client agent devices to determine the configuration settings. In other examples, the client agent device can store the configuration settings in long-term storage areas, so that the client agent device can be rebooted when it comes back online.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, access right passing, network transmission, etc. Further, elements and/or steps of methods described above and herein may be combined in any order or sequence.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

As used below, any reference to a series of examples is to be understood as a reference to each of those examples disjunctively (e.g., "Examples 1-4" is to be understood as "Examples 1, 2, 3, or 4").

Example 1 is a computer-implemented method, system, and/or computer-program product for facilitating post-entry transfer of access rights within defined locations. The method, system, and/or computer-program product may include identifying, by a computing device, a geographical location of a first user device, the first user device being associated with a digital token that represents a plurality of access rights to a defined location for a defined time period; detecting whether the geographical location of the first user device is within the defined location, the first user device gaining entry to the defined location using a first access right of the plurality of access rights; in response to the determining that the geographical location of the first user device is within the defined location, executing one or more protocols for location-based transferring of access rights, the one or more protocols for location-based transferring being available for execution when the first user device is within the defined location, and executing the one or more protocols including: displaying a transforming image on the first user device; receiving an indication from a second user device that the transforming image was captured at a camera of the second user device; and transmitting a second access right of the plurality of access rights from the first user device to the second user device, wherein receiving the second access right enables the second user device to exit the defined location.

Example 2 is the method, system, and/or computer-program product of example 1, wherein the one or more protocols for location-based transferring of access rights enables the first user to transfer one or more access rights of the plurality of access rights to user devices located within the defined location.

Example 3 is the method, system, and/or computer-program product of examples 1-2, further comprising: capturing, using the camera of the second user device, an image of the transforming image; analyzing the image to determine whether the image corresponds to a valid access right; and in response to determining that the image corresponds to a valid access right, enabling the transfer of the digital token from the first user device to the second user device.

Example 4 is the method, system, and/or computer-program product of examples 1-3, wherein the digital token is transmitted from the first user device to the second user device using a short-range communication channel.

Example 5 is the method, system, and/or computer-program product of examples 1-4, further comprising: capturing, using the camera of the second user device, an image of the transforming image; analyzing the image to generate a representation of the digital token, wherein the representation of the digital token is generated using one or more characteristics of the captured image; and storing, at the second user device, the representation of the digital token.

Example 6 is the method, system, and/or computer-program product of examples 1-5, wherein each access right of the plurality of access rights is associated with a user device, and wherein each access right of the plurality of access rights enables the associated user device to enter the defined location.

Example 7 method, system, and/or computer-program product of examples 1-6, further comprising: receiving an indication from a third user device that the transforming image has been captured at by a camera of the third user device; and transmitting a third access right of the plurality of access rights from the first user device to the third user device, the third access right enabling the third user device to exit the defined location.

What is claimed is:

1. A computer-implemented method for facilitating post-entry transfer of an electronic ticket within defined locations of a venues during events, comprising:

identifying, by a computing device, a geographical location of a first user device, the first user device being associated with a digital token that represents a plurality of electronic tickets to an event, and the event being hosted at a defined location of a venue for a defined time period;

detecting whether the geographical location of the first user device is within the defined location of the venue, the first user device gaining entry to the venue using a first electronic ticket of the plurality of electronic tickets; and in response to the detecting that the geographical location of the first user device is within the defined location of the venue, executing one or more protocols for location-based transferring of electronic tickets, the one or more protocols for location-based transferring of electronic tickets being available for execution when the first user device is within the defined location of the venue, and executing the one or more protocols including:

displaying a transforming image on a display of the first user device;

receiving an indication from a second user device that the transforming image was captured at a camera of the second user device; and transmitting a second electronic ticket of the plurality of electronic tickets from the first user device to the second user device, wherein receiving the second electronic ticket enables the second user device to exit the defined location of the venue and re-enter the venue at a later time.

2. The computer-implemented method of claim 1, wherein the one or more protocols for location-based transferring of electronic tickets enables the first user to transfer one or more electronic tickets of the plurality of electronic tickets to user devices located within the defined location.

3. The computer-implemented method of claim 1, further comprising:

capturing, using the camera of the second user device, an image of the transforming image;

analyzing the image to determine whether the image corresponds to a valid electronic ticket; and in response to determining that the image corresponds to a valid electronic ticket, enabling the transfer of the digital token from the first user device to the second user device.

4. The computer-implemented method of claim 1, wherein the digital token is transmitted from the first user device to the second user device using a short-range communication channel.

5. The computer-implemented method of claim 1, further comprising:
   capturing, using the camera of the second user device, an image of the transforming image;
   analyzing the image to generate a representation of the digital token, wherein the representation of the digital token is generated using one or more characteristics of the captured image; and
   storing, at the second user device, the representation of the digital token.

6. The computer-implemented method of claim 1, wherein each electronic ticket of the plurality of electronic tickets is associated with a user device, and wherein each electronic ticket of the plurality of electronic tickets enables the associated user device to enter the defined location.

7. The computer-implemented method of claim 1, further comprising:
   receiving an indication from a third user device that the transforming image has been captured at by a camera of the third user device; and
   transmitting a third electronic ticket of the plurality of electronic tickets from the first user device to the third user device, the third electronic ticket enabling the third user device to exit the defined location.

8. A system, comprising:
   one or more processors; and
   a non-transitory computer-readable storage medium containing instructions which, when executed on the one or more processors, cause the one or more processors to perform operations including:
      identifying, by the one or more processors, a geographical location of a first user device, the first user device being associated with a digital token that represents a plurality of electronic tickets to an event, and the event being hosted at a defined location of a venue for a defined time period;
      detecting whether the geographical location of the first user device is within the defined location of the venue, the first user device gaining entry to the venue using a first electronic ticket of the plurality of electronic tickets; and
      in response to the detecting that the geographical location of the first user device is within the defined location of the venue, executing one or more protocols for location-based transferring of electronic tickets, the one or more protocols for location-based transferring of electronic tickets being available for execution when the first user device is within the defined location of the venue, and executing the one or more protocols including:
         displaying a transforming image on a display of the first user device;
         receiving an indication from a second user device that the transforming image was captured at a camera of the second user device; and
         transmitting a second electronic ticket of the plurality of electronic tickets from the first user device to the second user device, wherein receiving the second electronic ticket enables the second user device to exit the defined location of the venue and re-enter the venue at a later time.

9. The system of claim 8, wherein the one or more protocols for location-based transferring of electronic tickets enables the first user to transfer one or more electronic tickets of the plurality of electronic tickets to user devices located within the defined location.

10. The system of claim 8, wherein the operations further comprise:
   capturing, using the camera of the second user device, an image of the transforming image;
   analyzing the image to determine whether the image corresponds to a valid electronic ticket; and
   in response to determining that the image corresponds to a valid electronic ticket, enabling the transfer of the digital token from the first user device to the second user device.

11. The system of claim 8, wherein the digital token is transmitted from the first user device to the second user device using a short-range communication channel.

12. The system of claim 8, wherein the operations further comprise:
   capturing, using the camera of the second user device, an image of the transforming image;
   analyzing the image to generate a representation of the digital token, wherein the representation of the digital token is generated using one or more characteristics of the captured image; and
   storing, at the second user device, the representation of the digital token.

13. The system of claim 8, wherein each electronic ticket of the plurality of electronic tickets is associated with a user device, and wherein each electronic ticket of the plurality of electronic tickets enables the associated user device to enter the defined location.

14. The system of claim 8, wherein the operations further comprise:
   receiving an indication from a third user device that the transforming image has been captured at by a camera of the third user device; and
   transmitting a third electronic ticket of the plurality of electronic tickets from the first user device to the third user device, the third electronic ticket enabling the third user device to exit the defined location.

15. A computer-program product tangibly embodied in a non-transitory machine-readable storage medium, including instructions configured to cause a data processing apparatus to perform operations including:
   identifying a geographical location of a first user device, the first user device being associated with a digital token that represents a plurality of electronic tickets to an event, and the event being hosted at a defined location of a venue for a defined time period;
   detecting whether the geographical location of the first user device is within the defined location of the venue, the first user device gaining entry to the venue using a first electronic ticket of the plurality of electronic tickets; and
   in response to the detecting that the geographical location of the first user device is within the defined location of the venue, executing one or more protocols for location-based transferring of electronic tickets, the one or more protocols for location-based transferring of electronic tickets being available for execution when the first user device is within the defined location of the venue, and executing the one or more protocols including:
      displaying a transforming image on a display of the first user device;
      receiving an indication from a second user device that the transforming image was captured at a camera of the second user device; and
      transmitting a second electronic ticket of the plurality of electronic tickets from the first user device to the second user device, wherein receiving the second electronic ticket enables the second user device to exit the defined location of the venue and re-enter the venue at a later time.

16. The computer-program product of claim 15, wherein the one or more protocols for location-based transferring of electronic tickets enables the first user to transfer one or more electronic tickets of the plurality of electronic tickets to user devices located within the defined location.

17. The computer-program product of claim 15, wherein the operations further comprise:
    capturing, using the camera of the second user device, an image of the transforming image;
    analyzing the image to determine whether the image corresponds to a valid electronic ticket; and
    in response to determining that the image corresponds to a valid electronic ticket, enabling the transfer of the digital token from the first user device to the second user device.

18. The computer-program product of claim 15, wherein the digital token is transmitted from the first user device to the second user device using a short-range communication channel.

19. The computer-program product of claim 15, wherein the operations further comprise:
    capturing, using the camera of the second user device, an image of the transforming image;
    analyzing the image to generate a representation of the digital token, wherein the representation of the digital token is generated using one or more characteristics of the captured image; and
    storing, at the second user device, the representation of the digital token.

20. The computer-program product of claim 15, wherein each electronic ticket of the plurality of electronic tickets is associated with a user device, and wherein each electronic ticket of the plurality of electronic tickets enables the associated user device to enter the defined location.

\* \* \* \* \*